United States Patent
Tashiro et al.

[11] Patent Number: 5,946,090
[45] Date of Patent: Aug. 31, 1999

[54] SPECTROMETRIC METHOD AND APPARATUS FOR SPECTROMETRY

[75] Inventors: Hideo Tashiro; Satoshi Wada; Kazuyuki Akagawa, all of Miyagi, Japan

[73] Assignee: The Institute of Physical and Chemical Research, Wako, Japan

[21] Appl. No.: 08/974,680

[22] Filed: Nov. 19, 1997

[30] Foreign Application Priority Data

Nov. 19, 1996 [JP] Japan ................................. 8-308335
Nov. 19, 1996 [JP] Japan ................................. 8-308336

[51] Int. Cl.$^6$ .................................................. G01J 3/28
[52] U.S. Cl. ...................... 356/326; 356/346; 356/352; 356/358
[58] Field of Search .................... 356/326, 346, 356/352, 358

[56] References Cited

U.S. PATENT DOCUMENTS 4,444,501  4/1984  Schwiesow ............................. 356/346

*Primary Examiner*—Frank G. Font
*Assistant Examiner*—Reginald A. Ratiff
*Attorney, Agent, or Firm*—Pillsbury Madison & Sutro LLP

[57] ABSTRACT

A spectrometric method is disclosed which uses a novel tunable laser as a monochromatic light source to carrying out spectrometry efficiently. As the tunable laser, a tunable laser is used which comprises a laser resonator so provided therein with a laser medium 14 capable of laser oscillation in a predetermined range of wavelength and a birefringent acousto-optic element 100 and which is capable of wavelength selection by selecting a frequency of an acoustic wave to be generated in the birefringent acousto-optic element 100 by means of a piezoelectric element 22 connected to a RF power source 20. The tunable laser is used instead of a spectroscopic light source and a monochromator in a conventional spectrophotometer to thereby carry out spectrometry efficiently. In case of detecting Raman scattered light no influence of fluorescence without using a spectroscope, a tunable laser 140 is controlled by a controlling device 141 to sweep a wavelength of a monochromatic light beam LB with which a sample S is irradiated while alternately switching the wavelength between a first frequency $\upsilon_{ex1}$ and a second frequency $\upsilon_{ex2}$ having a frequency difference $\Delta\upsilon_{ex}$ relative to the first frequency $\upsilon_{ex1}$. The resulting scattered light emanated from the sample S is detected by a photodetector 145 through an interference filter 144 which transmits light having an obsrvation frequency $\upsilon_{ob}$. Output of the photodetector 145 is subjected to phase synchronous detection by a lock-in amplifier 146 and processed by a signal processor 147 to obtain a Raman spectrum ot the sample S.

19 Claims, 27 Drawing Sheets

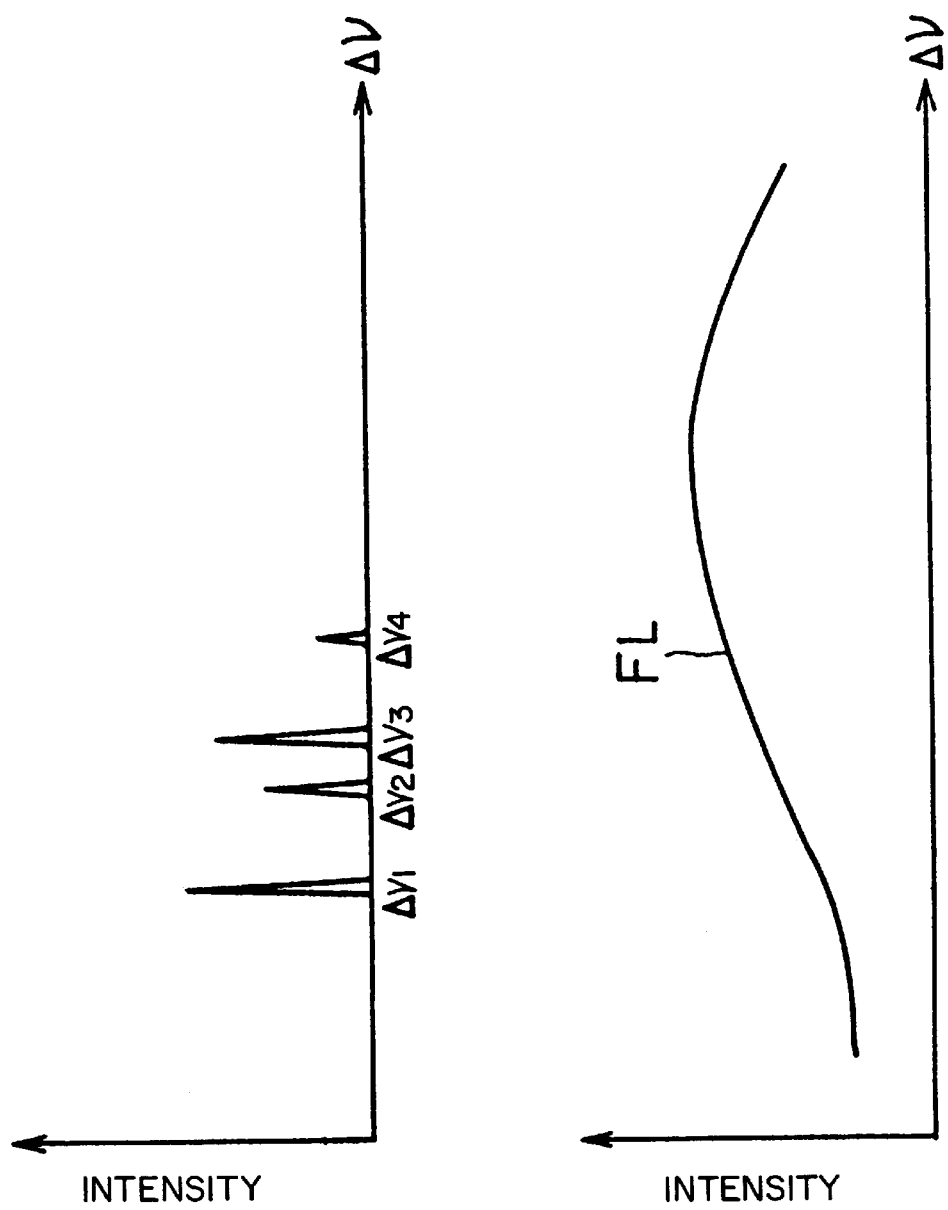

SPECTROMETRIC METHOD AND APPARATUS FOR SPECTROMETRY

BACKGROUND OF THE INVENTION

1. Field of the Invention

The present invention relates to a spectrometric method and an apparatus for spectrometry. In particular, it relates to a spectrometric method and an apparatus for spectrometry which use a tunable laser as a spectrometric light source, and a method for spectroscopic analysis and an apparatus for spectroscopic analysis for measuring emitted light emanated from a sample.

Meaning of the term "emitted light" used herein generically includes fluorescence and scattered light resulting from Raman scattering, which are emanated from a sample.

2. Description of the Prior Art

As sample analyzing methods having high sensitivity, spectrometric methods have been widely employed which comprise irradiating a sample with light in infrared region, visible region or ultraviolet region, and measuring, for example, absorption of the light by the sample, or light from the sample attributable to reflection, Rayleigh scattering, Raman scattering or fluorescence. By means of such spectrometric methods, it is possible to perform qualitative analysis such as identification or confirmation of a sample, quantitative analysis such as determination of concentration of a specific ingredient contained in a sample or determination of composition of a mixture, and analysis of electronic state or stereostructure of a molecule. If absorption spectrum of a sample is measured by means of time-resolution, it is also possible to perform analysis of progress of reaction or analysis of molecular structure of an intermediate In spectrometry, it is required to irradiate a sample with monochromatic light having a specific selected wavelength or to irradiate a sample with monochromatic light while continuously sweeping wavelength thereof. In general, a spectrophotometer is employed which comprises a white-light source and a monochromator in combination to obtain monochromatic light. Sweeping of wavelength of the monochromatic light emerging from an exit slit of the monochromator is effected by rotating a wavelength dispersing element, for example a diffraction grating, which is incorporated in the monochromator.

FIG. 23 is a diagrammatic view of a double-beam spectrophotometer as one form of conventional spectrophotometers. The spectrophotometer is for measuring absorption spectrum of a sample. A light beam emitted from a light source such as a tungsten lamp or deuterium discharge lamp, which is disposed in a light source section 200, passes through an entrance slit S, of a monochromator 210 and impinges upon a diffraction grating G via mirrors $M_1$, $M_2$. The light beam is subjected to wavelength dispersion by the diffraction grating G, and then it travels via mirrors $M_3$, $M_4$ and forms a spectral image at a position of an exit slit $S_2$. In consequence, monochromatic light 211 emerges from the exit slit $S_2$. The monochromatic light 211 emanated from the monochromator 210 enters a first sector mirror 221 which is rotating. The first sector mirror 221 has a light transmitting portion and a light reflecting portion and alternately directs the light beam to an optical path to a sample S and an optical path to a reference sample R. The monochromatic light 211 transmitted through the first sector mirror 221 enters the sample S. The light transmitted through the sample is reflected by a reflecting mirror 223 and then reflected by a second sector mirror 224, which is rotating synchronously with the sector mirror 221 under control of a controlling section 220, to enter a detector 230. On the other hand, the monochromatic light 211 reflected by the first sector mirror 221 is reflected by a reflecting mirror 222. Then, it is transmitted through the reference sample R and through the second sector mirror 224 and detected by the detector 230.

In some spectrometric methods, a tunable laser is used as a light source. As the tunable laser, there have been known a solid-state laser using a crystal of Ti:$Al_2O_3$ (titanium-containing sapphire) or the like as a laser medium and a liquid laser using a dye solution or the like as a laser medium As a wavelength selection method for inducing laser oscillation of such a tunable laser at a desired wavelength, for example, there has been employed one which comprises placing a diffraction grating, birefringent plate or the like in a laser resonator containing a laser medium, and allowing oscillation at only a specific wavelength to be induced in the laser resonator by mechanically rotating the diffraction grating or the like to obtain a laser beam having a desired wavelength.

Next, measurements of Raman scattering will be described. When a sample is irradiated with a laser beam having a frequency of $v_0 = c/\lambda$ wherein c is the light velocity and $\lambda$ is the wavelength of light), scattered light resulting from Raman scattering (Raman scattered light) is obtained which has frequency components shifted from the frequency $v_0$ of the incident light in an amount of $\pm\Delta v$. The differences $\pm\Delta v$ between the frequency $v_0$ of the incident light and the frequencies of the Raman scattered light are referred to as "Raman shift"s Of Raman lines, one having the frequency $(v_0 - \Delta v)$ lower than that of the frequency $v_0$ of the incident light is referred to as a Stokes line and the other having the frequency $(v_0 + \Delta v)$ higher than that of the frequency $v_0$ of the incident light is referred to as an anti-Stokes line. In common with infrared absorption, Raman scattering indicates state of molecular vibration of the sample. However, what is observed in an infrared absorption spectrum is molecular vibration accompanied by change in dipole moment, whereas Raman scattering results from molecular vibration accompanied by change in polarizability. Therefore, these provide different types of information. In addition, infrared absorption analysis on a sample in the form of an aqueous solution is very difficult. In contrast thereto, use of Raman scattering yields an advantage that analysis on a sample dissolved in water becomes easy, because a Raman spectrum of water is weak.

Since Raman scattered light is faint, a laser capable of providing a monochromatic light beam having high intensity is used as a light source in measurement of Raman scattering As a spectroscope for measuring Raman scattering, a monochromator is used which has sufficient resolving power and acceptably low level of stray light in order to separate Raman scattered light from light resulting from Rayleigh scattering (Rayleigh scattered light). Such a monochromator includes a double monochromator using two diffraction gratings and a triple monochromator using three diffraction gratings. As a detector, there may be mentioned a type which uses a photomultiplier tube and performs wavelength (frequency) scanning by turning the diffraction gratings of the spectroscope, or a type which uses an optical multi-channel analyzer and measures a spectrum at a time. Further, Fourier-Raman spectrometry is known which uses an interference spectroscope as a spectroscope.

Besides Raman scattered lights light which is detected at a frequency shifted from the frequency of the incident light includes fluorescence. Fluorescence can be emitted from impurities contained in a sample or can be emitted from the sample per se. In the latter cases emission of fluorescence is unavoidable even if impurities are removed. Further, fluorescence generally has considerably high intensity as compared with those of Raman scattered light. This creates difficulty in detection of Raman scattered light.

As means for measuring Raman scattered light with emission of fluorescence suppressed, it may be conceived to use light in the infrared region, of which use is free from emission of fluorescent, as excitation light. For example, use of light emitted from a YAG laser and having a wavelength of 1.06 $\mu$m may be conceived. However, use of infrared radiation as excitation light leads to disadvantageously weak Raman scattered light.

As other means for measuring a Raman spectrum with fluorescence separated, Japanese Unexamined Patent Publication No. 59693/1974 discloses a method which comprises irradiating a sample with a wavelength-modulated laser beam, separating light emitted from the sample by the irradiation with the laser beam into spectral components, detecting the spectral components, and selecting alternating current components from the detected signals. The method utilizes the fact that if a wavelength of an incident laser beam is shifted, a frequency of Raman scattered light is shifted owing to the shift of the wavelength of the incident laser beam, whereas a wavelength of a fluorescence is not shifted by the shift of the wavelength of the incident laser beam. A similar technique is also disclosed in each of Japanese Unexamined Patent Publication Nos. 80282/1976 and 39156/1978.

Each of Japanese Unexamined Patent Publication No. 60582/1974 and Japanese Examined Patent Publication No. 31893/1980 discloses a method which utilizes difference between degree of depolarization of Raman scattered light and degree of depolarization of fluorescence which are emitted from a sample to obtain a Raman spectrum free from influence of fluorescence. Japanese Examined Patent Publication No. 11511/1976 discloses a method which utilizes difference in lifetime between Raman scattered light and fluorescent to separate the Raman scattered light from the fluorescent.

Such spectrometric methods using a spectrophotometer are already established techniques and capable of carrying out measurement with high precision. In these methods, however, a monochromator for irradiation with monochromatic light is required, leading to an undesirably large-sized apparatus. Further, a light source cannot be separated from a detector. In consequence, size and state of a sample which can be placed in the spectrophotometer are restricted. Accordingly, it is impossible to pliably carry out spectrometry over samples in various state and under various conditions. Moreover, there is a problem that it is not easy to two-dimensionally measure a spectrometric spectrum of a sample such as an absorption spectrum or a reflection spectrum as a positional function of the sample.

On the other hand, in spectrometric methods using a laser as a light source, use of a monochromator is required because monochromatic light is obtained from a laser. However, a dye laser most widely used at present as a tunable laser has problems that a wavelength tunable range obtained by one dye is narrow, that since a diffraction grating, birefringent plate or the like is mechanically rotated to thereby effect wavelength selection, it is difficult to effect wavelength tuning at a high speed, and that in order to increase reproducibility, a wavelength can be swept only in one direction. Accordingly, a dye laser is not suitable for usual spectrometry such as measurement of absorption spectrum of a sample.

If an optical parametric oscillator (OPO) is utilized as a broad range tunable laser, a broad wavelength tunable range can be obtained. However, wavelength sweeping rate is low and reproducibility of wavelength is poor. Further, position and direction of an emitted light beam slightly vary depending upon its wavelength, and accordingly, its optical axis is unstable.

Spectroscopes using infrared semiconductor lasers have a disadvantage that since a wavelength tunable range obtained by one infrared semiconductor laser is narrow, use of a plurality of infrared semiconductor lasers and successive replacement thereof are required in order to effect measurement over a broad wavelength range.

With respect to a pulsed dye laser, a method for electrically sweeping an oscillation wavelength has been proposed which comprises placing a $CaMoO_4$ crystal in a dye solution as a laser medium and applying an acoustic wave to the $CaMoO_4$ crystal to provide a resonator so constructed as to resonate a component of a light beam which interacts with the acoustic wave, thereby tuning an oscillation wavelength of a laser (see Applied Physics Letters, Vol. 19, No. 8. pp. 269–271). However, the sweeping method has problems that a wavelength tunable range is narrow, that a complicated arrangement is required for integration of the crystal with the dye, that a specific crystal, i.e., a $CaMoO_4$ crystal is required, and that it is difficult to separate the light beam component interacting the acoustic wave from light beam components non-interactive with the acoustic wave because difference therebetween resides in rotatory polarization.

Further, in measurement of a Raman spectrum, as described above, a double monochromator, triple monochromator or the like is used as a spectroscope to separate faint Raman scattered light from Rayleigh scattered light, thereby attaining measurement with high resolving power. However, brightness of a spectroscope is incompatible with resolving power of the spectroscope. Accordingly, if high resolving power is required, brightness is sacrificed, resulting in measurement over a prolonged period of time. In addition,, a spectroscope occupies a large space, and use thereof involves complicated procedure including settings of a slit width, scanning rate and time constant, and wavelength calibration.

In Raman spectroscopic analysis, it is important to eliminate influence of fluorescent. However, any of the above-described conventional means for separating Raman scattered light from fluorescence uses a spectroscope as spectroscopic means. Accordingly, Raman spectroscopic analysis has the same problem.

SUMMARY OF THE INVENTION

The present invention has been made in view of the problems inherent in the conventional techniques It is, therefore, an object of the present invention to provide a simple spectrometric method and a simple apparatus for spectrometry which utilize a novel tunable laser as a monochromatic light source.

Another object of the present invention is to provide a method and an apparatus which are capable of simply measuring Raman scattering without using a spectroscope under no influence of fluorescent.

In the present inventions a newly developed electrically tuned tunable laser (hereinafter referred to as an ETT laser) is utilized as a spectroscopic light source, which electrically controls a wavelength of laser oscillation without using a mechanically movable part such as a rotating mechanism in order to enable high-speed wavelength sweeping to be realized. The present invention has thereby attained the above object.

As in the conventional methods, the present invention utilizes the fact that if a wavelength of an excitation laser beam is slightly shifted, a frequency of Raman scattered light is shifted in response to thereto, whereas a wavelength of fluorescence is not shifted thereby, so as to separate Raman scattered light from fluorescence. In the present invention, however, a spectroscope is not used as means for spectrometrically separating Raman scattered light, and instead thereof, only one narrow-band-pass filter such as an interference filter is used.

With reference to FIGS. 1(a) to (c) and 2(a) to (c), the principle of the measurement of Raman scattered light of the present invention will be described. FIGS. 1(a) to (c) is diagrammatic representations of Raman spectra with no emission of fluorescence from a sample. FIGS. 2(a) to (c) is schematic representations of spectra with superimposition of fluorescence upon Raman lines.

In FIG. 1(a), $\upsilon_{ex}$ represents a frequency of excitation light and $R_1$, $R_2$, $R_3$ and $R_4$ represent Raman lines. On the side of frequencies higher than that of the excitation light, anti-Stokes lines are seen. Herein, however, explanation will be given on Stokes lines appearing on the side of frequencies lower than that of excitation light. The Raman line $R_1$ appears at a position of a frequency shifted from the excitation frequency $\upsilon_{ex}$ in an amount of $\Delta\upsilon_1$. Likewise, the Raman lines $R_2$, $R_3$ and $R_4$ appear at positions of frequencies shifted from the excitation frequency $\upsilon_{ex}$ in amounts of $\Delta\upsilon_2$, $\Delta\upsilon_3$ and $\Delta\upsilon_4$, respectively. These Raman shifts $\Delta\upsilon_1$, $\Delta\upsilon_2$, $\Delta\upsilon_3$ and $\Delta\upsilon_4$ are the amounts intrinsic to a substance.

As shown in FIG. 1(b), when the frequency of the excitation light is shifted to a frequency higher than the $\upsilon_{ex}$, for example, a frequency of $\upsilon_{ex}'$, the Raman lines $R_1$, $R_2$, $R_3$ and $R_4$ are also shifted to higher frequencies while maintaining the shift amounts of $\Delta\upsilon_1$, $\Delta\upsilon_2$, $\Delta\upsilon_3$ and $\Delta\upsilon_4$ constant relative to the frequency $\upsilon_{ex}'$ of the excitation light. Accordingly, if scattered light from a sample is observed at a fixed observation frequency of $\Delta_{ob}$ shown in FIGS. 1(a) and 1(b) by means of a narrow-band-pass filter such as an interference filter while sweeping the frequency of the excitation light toward, for example, higher frequencies, the Raman lines $R_1$, $R_2$, $R_3$ and $R_4$ are sequentially detected as $\Delta\upsilon=\upsilon_{ex}-\upsilon_{ob}$ becomes $\Delta\upsilon_1$, $\Delta\upsilon_2$, $\Delta\upsilon_3$ and $\Delta\upsilon_4$. As a result, a Raman spectrum as shown in FIG. 1(c) is obtained.

On the other hand, in a case where fluorescence is emitted from a sample as well as Raman scattered light, if a frequency of excitation light is swept in the same manner as described above and the light scattered from the sample is detected at the fixed observation frequency of $\Delta\upsilon_{ob}$, a spectrum is obtained wherein Raman lines $R_1$, $R_2$, $R_3$ and $R_4$ are on a spectrum of fluorescence FL, as shown by the solid line in FIG. 2(a).

In the present invention, the frequency of the excitation laser beam is alternately switched between two frequencies of $\Delta\upsilon_{ex1}$ and $\Delta\upsilon_{ex2}$ at a high speed. The Raman lines $R_1$, $R_2$, $R_3$ and $R_4$ are shifted between positions shown by the solid and broken lines in FIG. 2(a) in synchronism with the switching On the other hand, no substantial change occurs with respect to fluorescence, even if the frequency of the excitation light is switched at a high speed. Accordingly, when the frequency of the excitation laser beam is swept toward, for example, higher frequencies while being switched between the two frequencies and signals detected at the fixed observation frequency of $\upsilon_{ob}$ is subjected to synchronous detection in phase with the excitation frequency switching signals, a Raman spectrum as shown in FIG. 2(b) is obtained.

Conversely, if the Raman spectrum shown in FIG. 2(b) is removed from the spectrum shown in FIG. 2(a), a fluorescence spectrum FL as shown in FIG. 2(c). In other words, the present invention can be utilized in order to measure a Raman spectrum of a sample, and it can also be utilized in order to precisely measure a fluorescence spectrum of a samples To detect a Raman spectrum in this manner, a tunable laser is indispensable which is capable of performing frequency scanning over a broad tange while alternately switching frequency (excitation wavelength) at a high speed. For this purpose, aforementioned ETT can be used which has been developed by the present inventors and which electrically controls a wavelength of laser oscillation without using a mechanically movable part such as a rotating mechanism to enable high-speed wavelength sweeping to be realized.

The ETT laser used in the present invention is a tunable laser comprising a laser resonator so provided therein with a laser medium capable of laser oscillation in a predetermined range of wavelength and a birefringent acousto-optic element as to perform laser oscillation with respect only to a beam component diffracted by the birefringent acousto-optic element, and the tunable laser is capable of wavelength selection by selecting a frequency of an acoustic wave to be generated in the birefringent acousto-optic element. For example, it is possible to perform wavelength sweeping in a wavelength range of 680 nm to 100 nm in a period of 1 second or shorter by selecting titanium-containing sapphire as the laser medium. Further, since wavelength seclection is electrically performed by means of the birefringent acousto-optic element, wavelength can be changed in a moment. For example, change between two wavelengths can stably be perfomed in a period 1 ms or shorter. The present invention has been realized on the basis primarily of the development of the tunable laser (ETT laser).

By virtue of the capability of sweeping wavelength in such a broad wavelength range in a moment while maintaining monochromaticity of a laser, the light source 200 and the spectroscope 210 in FIG. 23 can be unified and a monochromatic light beam having high spectrum intensity and directivity can be obtained. The ETT laser can, of course, be utilized as a light source of a conventional absorption type spectroscope. Further, since a light beam emitted therefrom is a laser beam, the light beam is introduced into an optical fiber with ease. This enables remote monitoring spectrometry utlizing an optical fiber to be easily realised.

According to the present invention, there is provided a method for spectroscopic analysis carried out by means of irradiation of a sample with a monochromatic light beam from a tunable laser and measurement of emitted light emanated from the sample, the method comprising:

using, as the tunable laser, a tunable laser (ETT laser) comprising a laser resonator so provided therein with a laser medium capable of laser oscillation in a predetermined range of wavelength and a birefringent acousto-optic element as to be on a predetermined optical axis of a beam component diffracted by the birefringent acousto-optic element, the tunable laser being capable of wavelength selection by selecting a frequency of an acoustic wave to be generated in the birefringent acousto-optic element; and measuring intensity of the emitted light emanated from the sample at a predetermined wavelength.

Further, according to the present invention, there is provided a method for spectroscopic analysis carried out by means of irradiation of a sample with a monochromatic light beam from a tunable laser such as an ETT laser and observation of emitted light emanated from the sample, the method comprising:

sweeping a wavelength of the monochromatic light beam with which the sample is irradiated at a high speed, and observing the emitted light emanated from the sample at a predetermined wavelength to obtain a spectrum of the emitted light at the observation wavelength.

According further to the present invention, there is provided a method for spectroscopic analysis carried out by means of irradiation of a sample with a monochromatic light beam from a tunable laser and observation of emitted light emanated from the sample, the method comprising:

sweeping a wavelength of the monochromatic light beam with which the sample is irradiated while being alternately switched between a first wavelength and second wavelength having a constant frequency difference relative to the first wavelength, and observing the emitted light emanated from the sample at a third wavelength to regard a component of the observed light which is changed in terms of time in phase with the wavelength switching as Raman scattered light, thereby attaining separate observation of Raman scattered light.

In this case, it is preferred that the emitted light emanated from the sample be observed at a fourth wavelength different from the third wavelength as well as at the third wavelength, and correlations with the frequency difference be compared between the third and fourth wavelengths to precisely separate Raman scattered light.

Further, a component which is not changed by the wavelength switching in terms of time may be regarded as non-Raman component to attain separate observation of Raman scattered light.

The sample may be irradiated with the monochromatic light beam from the tunable laser via an optical fiber and the emitted light emanated from the sample may be observed via an optical fiber, thereby enabling telemetrical measurement of the sample. Further, the sample may relatively be subjected to scanning with the monochromatic light beam from the tunable laser to measure distribution of emitted light in a two-dimensional area of the sample.

According to the present invention, there is provided an apparatus for spectroscopic analysis comprising:

a tunable laser for irradiating a sample with a monochromatic light beam, wavelength controlling means for sweeping a wavelength of oscillation of the tunable laser while switching the wavelength between a first wavelength and a second wavelength having a constant frequency difference relative to the first wavelengths, a narrow-band-pass filter which transmits light having a third wavelength, a photodetector for detecting the light having the third wavelength which has been emitted form the sample by the irradiation with the monochromatic light beam and transmitted by the narrow-band-pass filter, and phase synchronous detection means for synchronously detecting detection signals of the photodetector in phase with wavelength switching signals between the first and second wavelengths; the apparatus thereby having function of measuring a Raman spectrum of the sample.

Further, according to the present invention, there is provided an apparatus for spectroscopic analysis comprising:

a tunable laser for irradiating a sample with a monochromatic light beam, wavelength controlling means for sweeping a wavelength of oscillation of the tunable laser while switching the wavelength between a first wavelength and a second wavelength having a constant frequency difference relative to the first wavelength, a first narrow-band-pass filter which transmits light having a third wavelength, a second narrow-band-pass filter which transmits light having a fourth wavelength different from the third wavelength, a first photodetector for detecting the light which has been emitted form the sample by the irradiation with the monochromatic light beam and transmitted by the first narrow-band-pass filter, a second photodetector for detecting the light which has been transmitted by the second narrow-band-pass filter, phase synchronous detection means for synchronously detecting detection signals of the first and second photodetectors in phase with wavelength switching signals between the first and second wavelengths, and comparing means for comparing the two phase synchronous detection signals of the phase synchronous detection means; the apparatus thereby having function of measuring a Raman spectrum of the sample.

According further to the present invention, there is provided an apparatus for spectroscopic analysis comprising:

a tunable laser for irradiating a sample with a monochromatic light beam, wavelength controlling means for sweeping a wavelength of oscillation of the tunable laser while switching the wavelength between a first wavelength and a second wavelength having a constant frequency difference relative to the first wavelength, an interferometer for subjecting the emitted light emanated from the sample by the irradiation with the monochromatic light beam to interference spectrometry, phase synchronous detection means for synchronously detecting output signals of the interferometer in phase with wavelength switching signals of the wavelength controlling means, and means for subjecting output of the phase synchronous detection means to Fourier transform; the apparatus thereby having function to measure a Raman spectrum of the sample.

It is preferred that the tunable laser used in the apparatus for spectroscopic analysis according to the present invention be a tunable laser comprising a laser resonator so provided therein with a laser medium capable of laser oscillation in a predetermined range of wavelength and a birefringent acousto-optic element as to be on a predetermined optical axis of a beam component diffracted by the birefringent acousto-optic elements the tunable laser being capable of wavelength selection by selecting a frequency of an acoustic wave to be generated in the birefringent acousto-optic element. In other words, the tunable laser is preferably an ETT laser.

DESCRIPTION OF THE INVENTION

In the following, explanation will be given on principle of laser oscillation wavelength selection in the ETT laser using a birefringent acousto-optic element.

Figure 3:
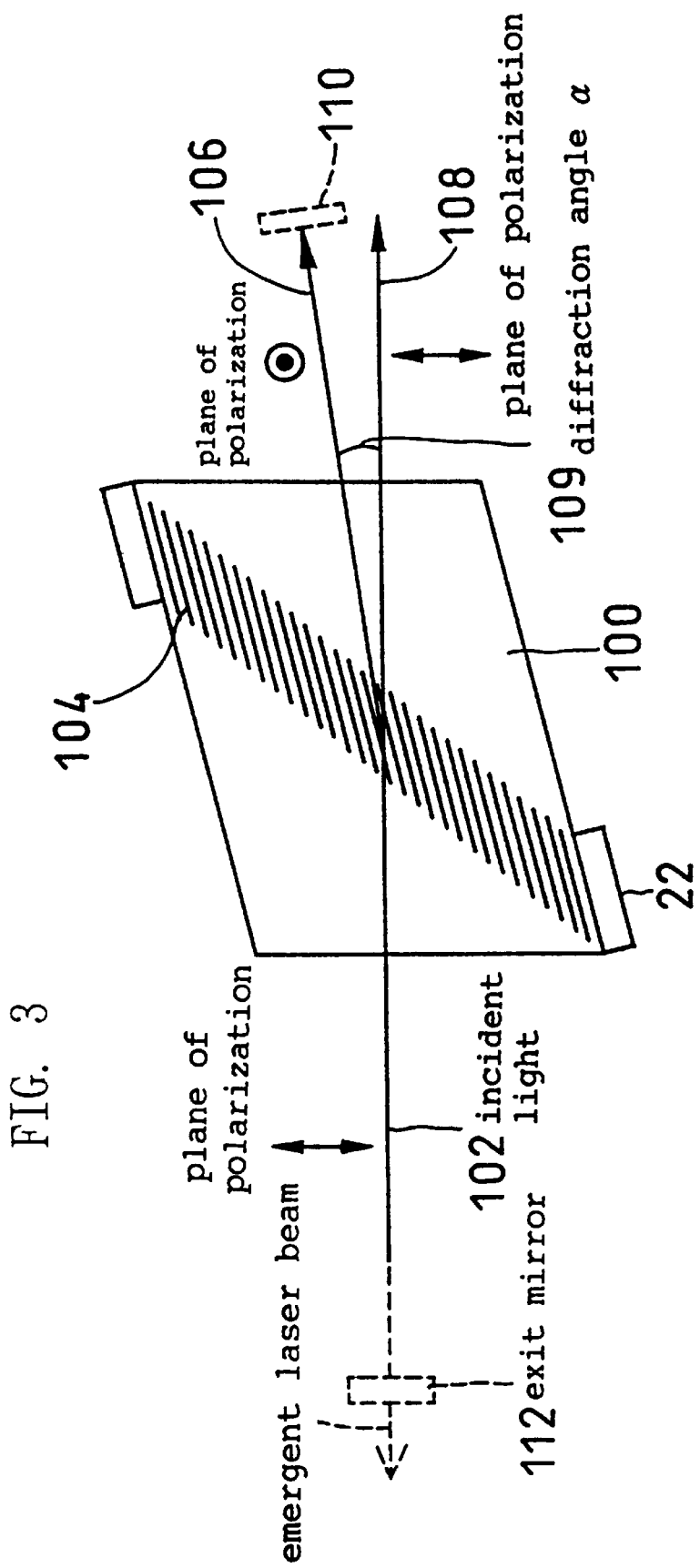
FIG. 3 is a conceptional view illustrating wavelength selecting function by means of a birefringent acousto-optic element.

When an acoustic wave is generated in an acousto-optic crystal showing birefringent properties, a light component of light incident upon the crystal which has a specific wavelength corresponding to the frequency of a acoustic wave is strongly diffracted in the direction satisfying phase matching condition among the acoustic wave, the incident light and the diffracted light component. FIG. 3 is a conceptional view showing the diffraction.

If incident light 102 having an angular frequency of $\omega$ enters a birefringent acousto-optic element 100 comprising a birefringent acousto-optic crystal such as a $TeO_2$ crystal and a piezoelectric element 22 provided thereon, and an acoustic wave 104 having an angular frequency of $\omega$ a is generated in the birefringent acousto-optic element 100 by means of the piezoelectric element 22, a diffracted light 106 is obtained whose frequency is shifted to an angular frequency of $\omega o$ represented by the following formula (1) due to interaction between the incident light 102 and the acoustic wave 104. In this connections the incident light 102 is an extraordinary ray and the diffracted light 106 is an ordinary ray, and the diffracted light 106 has a plane of polarization perpendicular to that of the incident light 102. Reference number 108 represents undiffracted light.

$$\omega o = \omega i + \omega a \quad (1)$$

wherein $\omega a \ll \omega i$, $\omega o$, and accordingly, it may be deemed that $\omega i \approx \omega o$.

If wave vectors of the incident light 102, acoustic wave 104 and diffracted light 106 are represented by ki, ka and ko, respectively, relationship among the wave vectors is expressed by the following vector equation as formula (2) in accordance with the phase matching condition.

$$ko = ki + ka \quad (2)$$

Figure 4A:
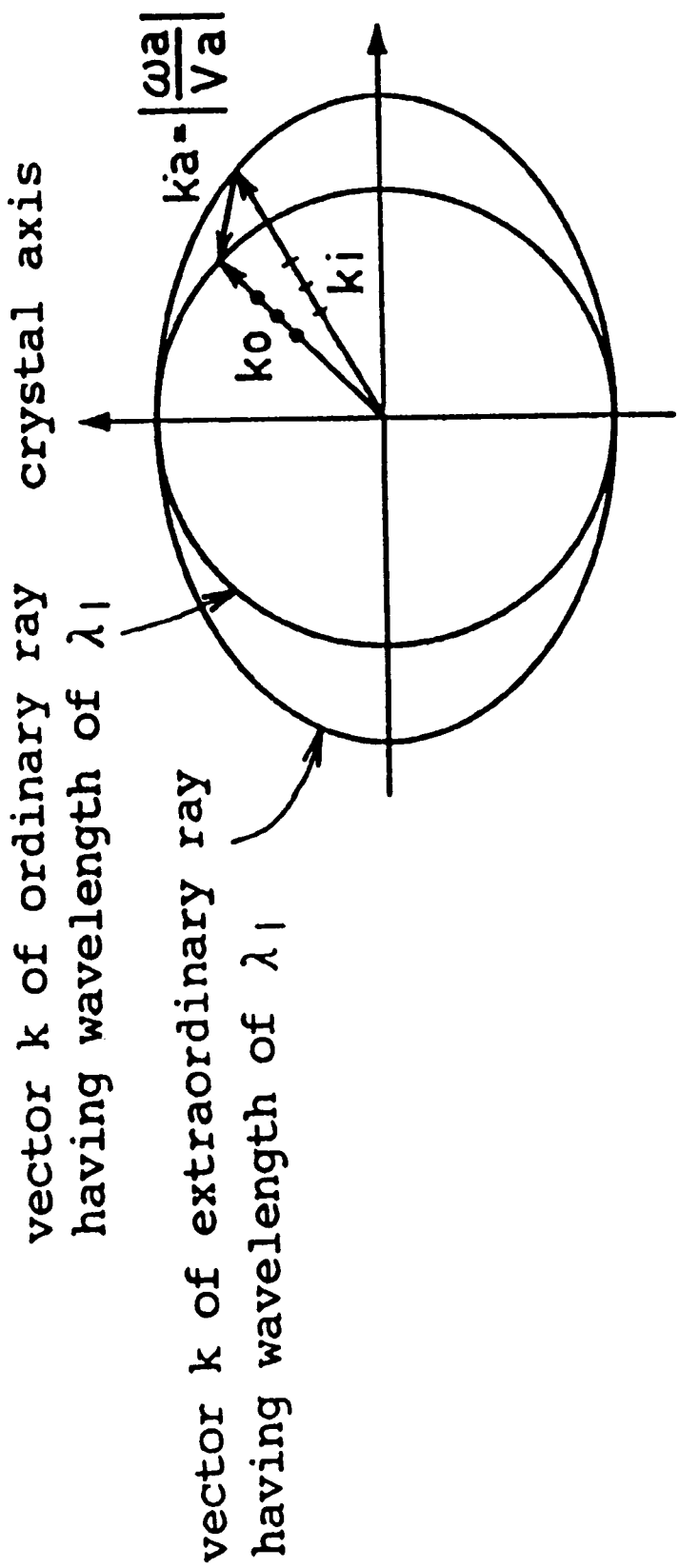
FIGS. 4(a) to (c) are graphical representations showing relationship between k vector of an ordinary ray and k vector of an extraordinary ray, which propagate in the birefringent acousto-optic element.
Figure 4:
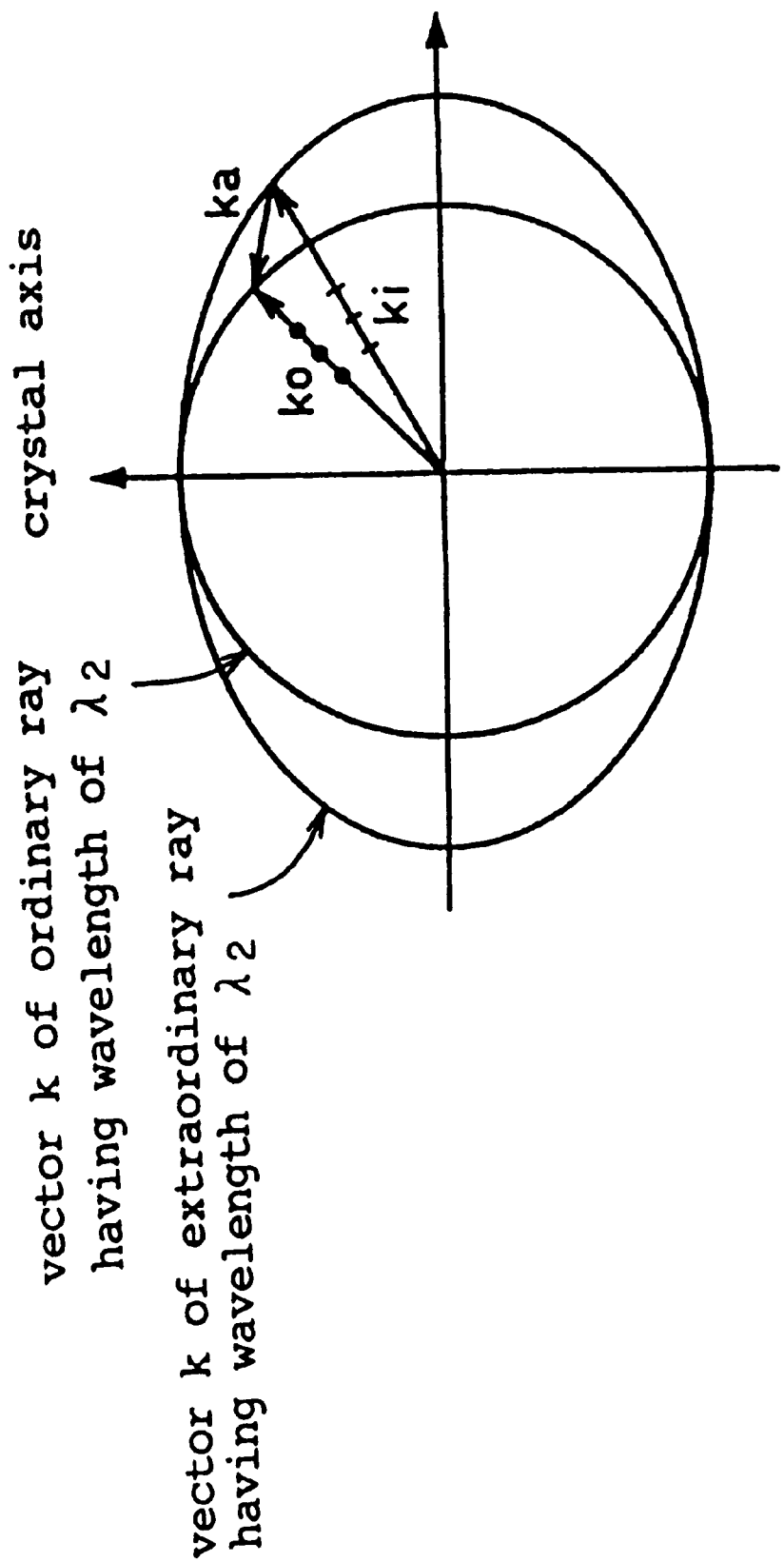
Figure 4:
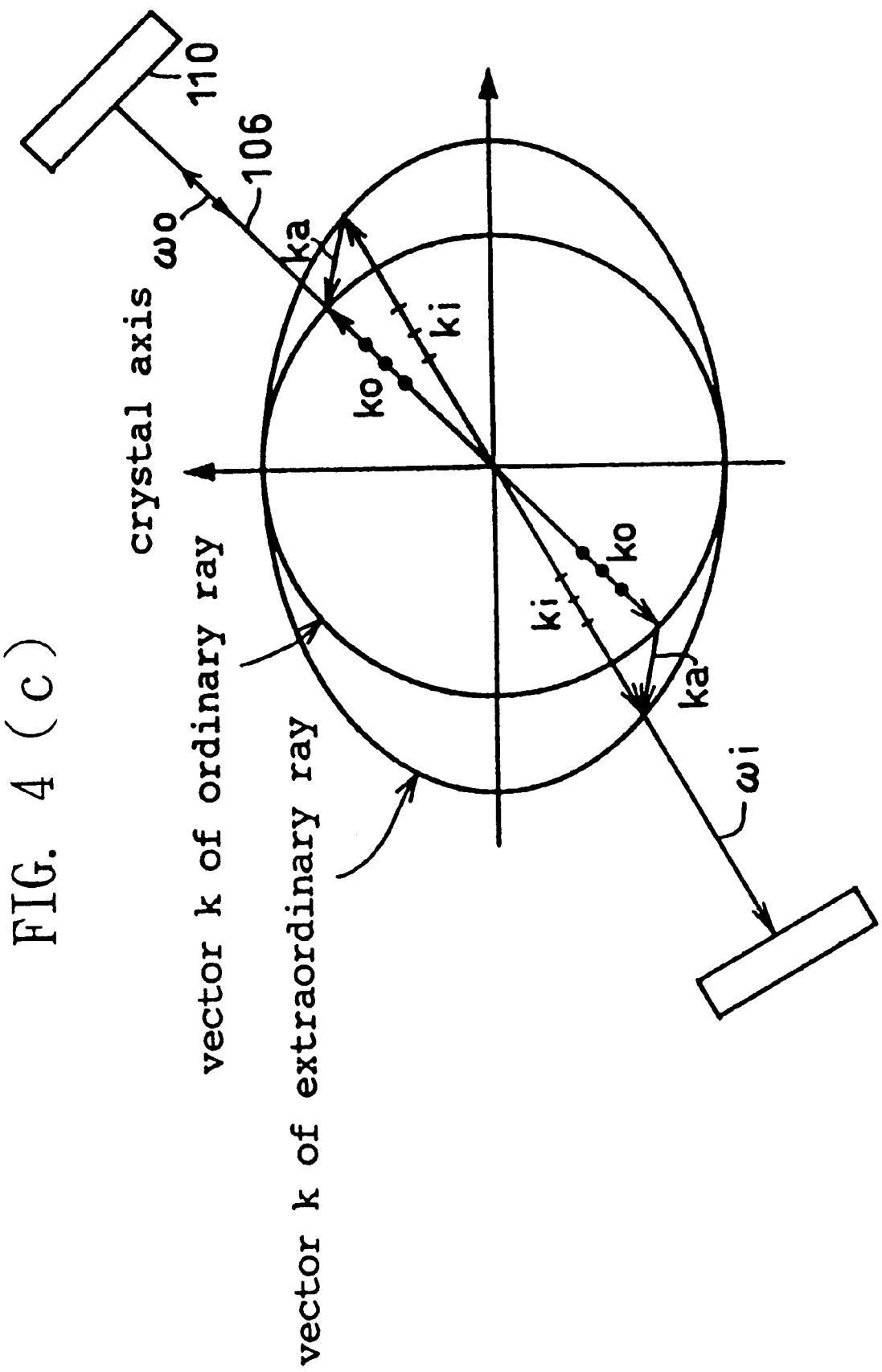

FIGS. 4 (a) to (c) shows relationship between k vector of the ordinary ray and k vector of the extraordinary ray which propagate in the birefringent acousto-optic element 100. The k vector of the ordinary ray has a constant magnitude irrespective of traveling directions, and thus locus of the terminal of the ordinary ray's k vector is circular. On the other hand, the k vector of the extraordinary ray has a magnitude dependent upon angles of propagation relative to the crystal axis of the birefringent acousto-optic element 100, and thus locus of the terminal of the extraordinary ray's k vector is elliptical. The circular and elliptical loci of the k vectors substantially similarly extend or contract by changes in wavelength. FIG. 4(a) shows a state in which the phase matching condition expressed by the formula (2) is satisfied with respect to a wavelength $\lambda_1$. In FIG. 4(a), Va represents a velocity of the acoustic wave 104 propagating in the crystal, and magnitude of a wave vector kal of the acoustic wave 104 is expressed by $|\omega a/Va|$.

If the frequency $\omega$ a of the acoustic wave 104 generated in the birefringent acousto-optic element 100 is changed and thus the magnitude of the wave vector ka is changed, the phase matching condition expressed by the formula (2) is not satisfied with respect to the wavelength $\lambda_1$. In this case, the phase matching condition is satisfied with respect to a wavelength $\lambda_2$ as shown in FIG. 4(b). Thus, the wavelength $\lambda$ of the light which satisfies the phase matching condition and the angular frequency $\omega a$ of the acoustic wave correspond to each other in a one-to-one relationship.

As described above, the circular and elliptical loci of the terminals of the k vectors vary in size depending upon the wavelength but undergo no substantial change in shape irrespective of the wavelength. Accordingly, even if the wavelength is changed from $\lambda_1$ to $\lambda_2$, and thereby, the magnitudes of the vectors ki, ko of the incident light 102 and diffracted light 106 are changed, the loci of the terminals of the vectors maintain similarities in shape. Therefore, directions of vectors (ko$_1$–ki$_1$), (ko$_2$–ki$_2$) are parallel to each other. Accordingly, by simply changing frequency of the acoustic wave, it is possible to apply an acoustic wave of a vector parallel to the vectors ka$_1$=ko$_1$–ki$_1$ and vector ka$_2$=ko$_2$–ki$_2$.

The light of the wave vector ko which has emerged from the birefringent acousto-optic element 100 is reflected by a reflecting mirror 110 and thereby caused to enter the birefringent acousto-optic element 100 from the reverse direction. Then, the returned light is diffracted again by the acoustic wave into light of vector –ki, which travels in the direction reverse to that of the incident light of vector ki, and reversely follows the optical path of the incident light, as shown in FIG. 4(*c*).

Figure 5:
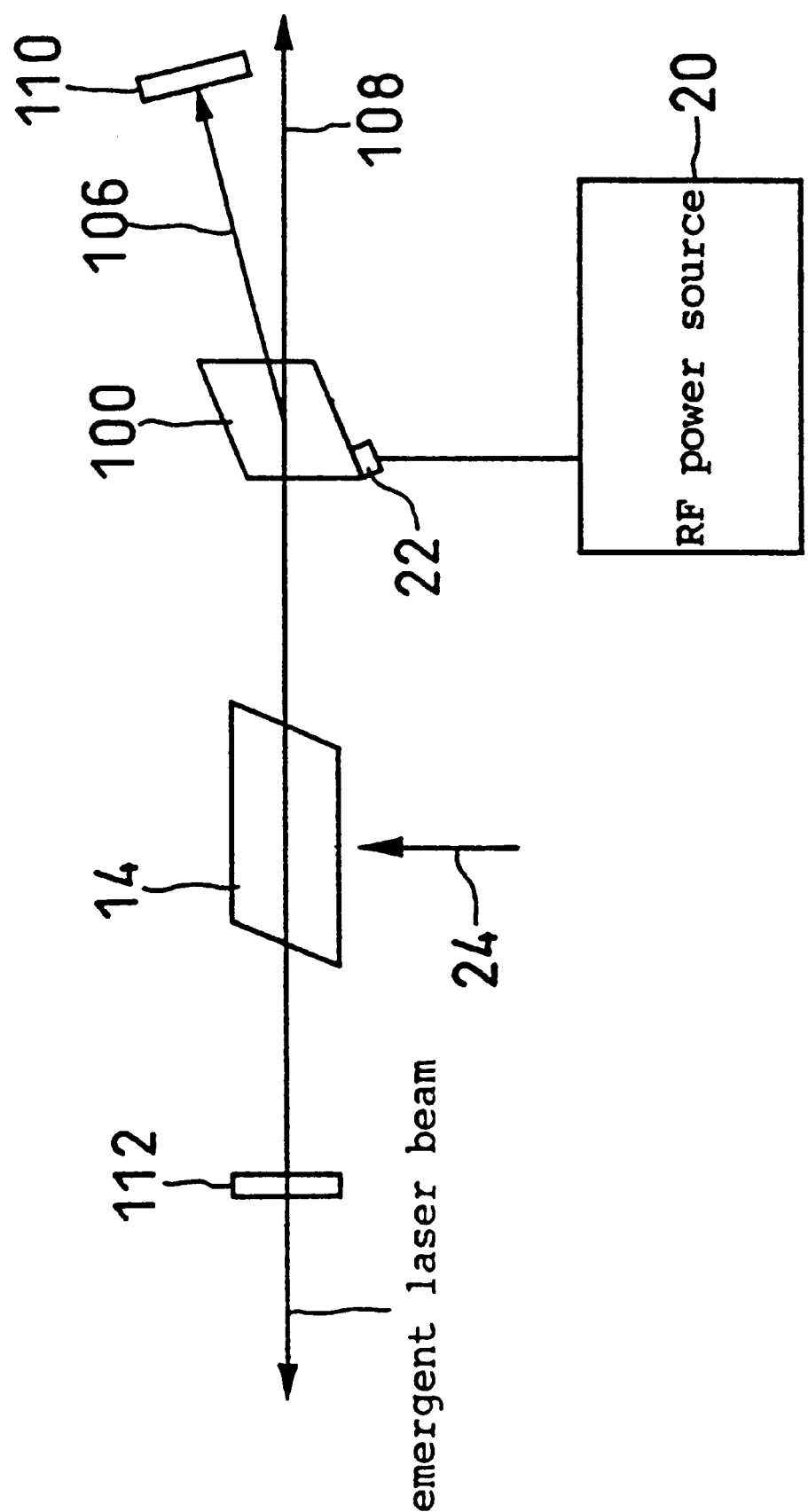
FIG. 5 is an illustrative view of one form of the ETT laser.

Therefore, as shown in FIG. 5 by way of an example, by placement of the total reflection mirror 110 and the exit mirror 112 having a predetermined trasmittance with the laser medium 14 and the birefringent acousto-optic element 100 disposed therebetween, a laser resonator is provided which permits only a light component having a specific wavelength to reciprocate. With respect to wavelength $\lambda$o of the diffracted light 106, if the frequency $\omega$a of the acoustic wave 104 generated in the birefringent acousto-optic element 100 is changed, the vector ka is changed and the vector ki is in turn selected. As a result, wavelength $\lambda i=2\pi/|ki|$ is determined. It is, therefore, possible to control the wavelength $\lambda i$ of the laser oscillation by actuating the piezoelectric element 22 attached to the birefringent acousto-optic element 100 with RF signals having a predetermined frequency from the RF power source 20.

Further, since diffraction efficiency of the diffracted light 106 is determined by intensity of the acoustic wave 104 generated in the birefringent acousto-optic element 100, it is possible to variably control intensity of the diffracted light 106, i.e., laser output by controlling amplitude of radio frequency (RF) signals sent from a radio frequency (RF) power source 20.

In the above, it is described that the circular and elliptical loci derived from connecting terminals of the k vectors show no substantial change in shape irrespective of wavelengths. In reality, however, the loci undergo slight change in shape. Accordingly, diffraction angle slightly varies depending upon wavelengths. In consequence, change is caused in the phase matching condition in the resonator comprising the total reflection mirror 110 and the partial transmission mirror 112. This leads to slight change in the direction of the emergent laser beam However, the dependence of the diffraction angle on wavelength can be compensated by placing a wavelength dispersion compensating element such as a prism between the birefringent acousto-optic element 100 and the total reflection mirror 110. It is, therefore, possible to attain a constant direction of the emergent laser beam over all wavelengths.

As the laser medium, there may be employed any known tunable laser medium, for example, a laser crystal such as Ti:Al$_2$O$_3$, LiSAF or LiCAF, or a dye solution.

The ETT laser may be a continuous oscillation laser using a continuous-wave laser (CW laser) as an excitation laser source or a pulsed oscillation laser using a pulsed laser as an excitation laser. For example, when Ti:Al$_2$O$_3$ is used as a laser medium, second harmonic of a Nd solid-state laser such as a Nd:YAG laser, Nd:YLF laser or Nd:YVO$_4$ laser, or an argon ion laser may be used. When a LiSAF laser crystal, LiCAF laser crystal or the like is used as a laser medium, a semiconductor laser or a krypton ion laser may be used as the excitation source.

If excitation volume with an excitation laser and optical mode volume in a laser resonator are matched so as to increase efficiency and thus to reduce excitation input, a highly repetitively pulsed excitation laser or a continuous oscillation laser can be used as an excitation laser which cannot provide high output powers. For example, if a laser resonator of a Z-hold type or X-hold type is used as a laser resonator and light of an excitation laser is introduced along an optical path in the laser resonator, the light for excitation is efficiently utilized. In consequence, laser oscillation can be induced with low energy excitation light.

By the use of the ETT laser as a light source of spectrometry, a light source section, a sample section and a detector section can be placed separately from each other. This enables telemetrically measuring a sample placed at a distant position. Further, a laser beam is emitted as a beam having good directivity, and accordingly, it can be directed to an optical fiber efficiently. By connecting the light source section with the sample section and the sample section with the detector section by means of optical fibers, telemetrical measurement can be carried out with ease.

Moreover, if a sample is subjected to two-dimensional scanning with a laser beam while sweeping wavelength of the laser beam of the ETT laser, it is thereby possible to easily carry out spectral measurement of a two-dimensional area of the sample.

Furthermore, if a laser beam is caused to converge upon a sample by means of a lens or the like by utilizing good converging properties inherent in laser beams, spectrometry can be carried out even in a spatially limited place.

DESCRIPTION OF THE PREFERRED EMBODIMENTS

In the following, embodiments of the present invention will be described with reference to the accompanying drawings.

First, explanation is given on the ETT laser used in the present invention with reference to FIGS. 5 to 11. In the drawings, the same reference numbers are allotted to the same or corresponding parts to eliminate overlapping explanation.

FIG. 5 diagrammatically shows one form of the ETT laser used in the present invention. In FIG. 5, the same reference numbers are allotted to the same parts as those shown in FIG. 3 for easy understanding The ETT laser comprises a total reflection mirror 110 and an exit mirror 112 having a predetermined trasmittance (for example, reflectance: 98%, transmittance: 2%) to constitute a laser resonator. In the laser resonator, a tunable laser medium 14 and a birefringent acousto-optic element 100 for wavelength selection are disposed in this order between the total reflection mirror 110 and the exit mirror 112. The birefringent acousto-optic element 100 is provided with a piezoelectric element 22 as acoustic wave applying means, which is powered by a radio frequency (RF) power source 20. When the piezoelectric element 22 is actuated by the RF power source 20, an acoustic wave propagates across the birefringent acousto-optic element 100. The total reflection mirror 110 is adapted to vertically reflect only a diffracted light 106 diffracted by the birefringent acousto-optic element 100 in a predetermined direction.

The laser medium 14 is excited by an excitation laser beam 24. On the basis of the above-described principles a frequency of the RF power source 20 is controlled according to an intended frequency (wavelength) of a laser beam to be generated by laser oscillation. By this control, of light having a wide range of wavelength which is emanated from the laser medium 14 and enters the birefringent acousto-optic element 100 light having a frequency ωo, which is expressed by the following formula and corresponds to a frequency ωa of the RF power source 20, is diffracted by the birefringent acousto-optic element 100 as a diffracted light 106 toward the total reflection mirror 100.

$$\omega o = \omega i + \omega a$$

Figure 6:
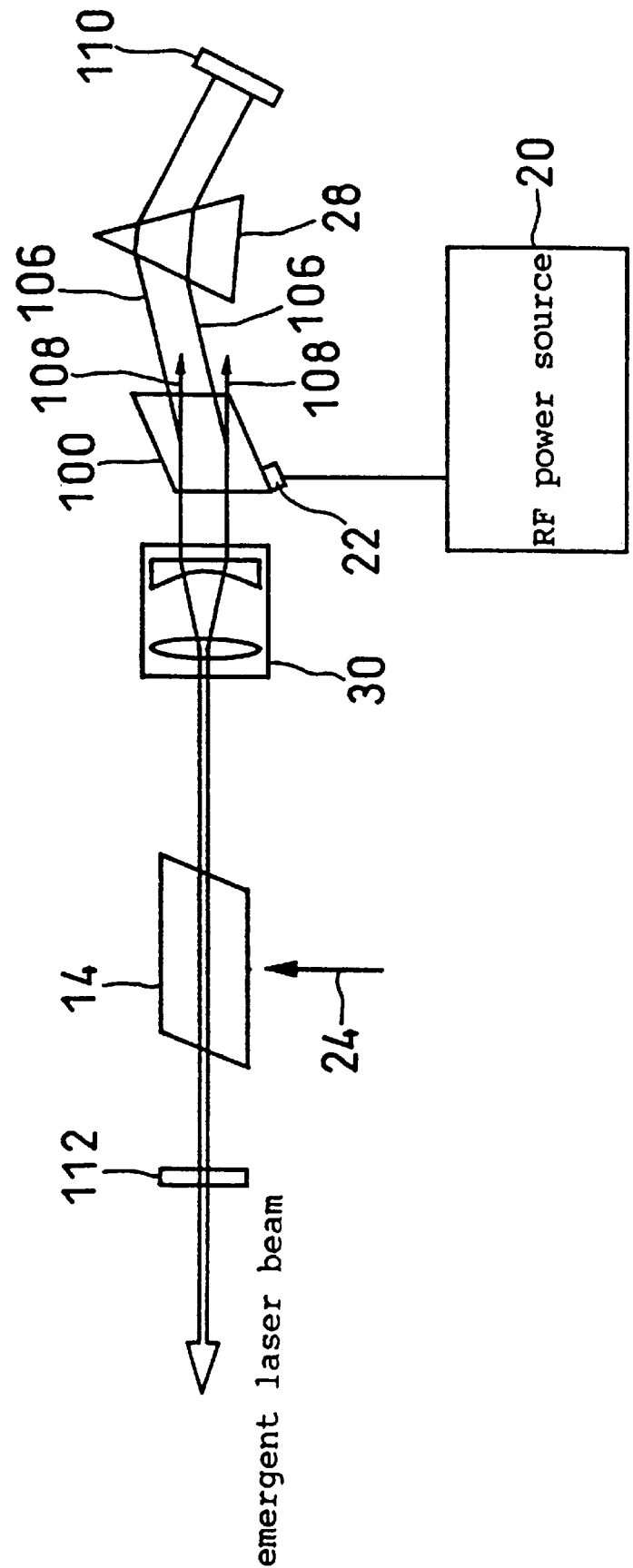
FIG. 6 is an illustrative view of another form of the ETT laser.

In this manner, only light having the frequency ωi is permitted to reciprocate through the laser medium 14 and amplified by the laser medium 14 to induce laser oscillation and emanated from the laser resonator as a laser beam FIG. 6 shows an example of a laser provided with beam diameter magnifying means for preventing optical damage of a birefringent acousto-optic element and also with a prism as a wavelength dispersion compensating element, which is disposed between the birefringent acousto-optic element and the total reflection mirror, for compensating dependence of a diffraction angle on wavelength to permit laser oscillation in a wide wavelength range.

Between the laser medium 14 and the birefringent acousto-optic element 100, a telescope 30 for adjusting beam diameter is disposed. Accordingly, parallel beams having a diameter magnified by the telescope 30 travel through the birefringent acousto-optic element 100. According to this arrangement, the light reciprocating in the laser resonator travels through the laser medium 14 as a converged light beam having high light intensity, and thus no substantial lowering in laser efficiency is caused. On the other hand, the birefringent acousto-optic element 100 is irradiated with light having lowered intensity per unit surface area, thereby preventing optical damage in the birefringent acousto-optic element 100.

Between the birefringent acousto-optic element 100 and the total reflection mirror 110, a prism 28 is disposed as a wavelength dispersion compensating element for keeping diffraction angle. The prism 28 is so designed as to permit diffracted light 106 emerging from the birefringent acousto-optic element 100 to always perpendicularly impinge upon the total reflection mirror 110 irrespective of wavelength of the diffracted light 106. The diffracted light 106 diffracted by the birefringent acousto-optic element 100 is thereby reflected by the reflection mirror 110 and permitted to reversely follow the same optical path at any wavelength. The diffracted light 106 is efficiently amplified by the laser medium 14 to induce laser oscillation. If wavelength dispersion is caused in the diffraction angle of the diffracted light, change is caused in the optical path of the diffracted light in the laser resonator. This imposes restriction on a wavelength tunable range. However, the problem can be solved by the use of the dispersion compensating prism 28. Further, by the use of the wavelength dispersion compensating prism 28 for keeping diffraction angle, direction of the emergent laser beam is kept constant.

In the example shown in FIG. 6, the telescope 30 for adjusting beam diameter and the wavelength dispersion compensating element 28 are provided in the laser resonator. However, if it is not necessary to take into account optical damage of the birefringent acousto-optic element 100 the telescope 30 may be omitted. On the other hand, if it is not necessary to take into account wavelength-dependence of angle of diffraction by the birefringent acousto-optic element 100 the wavelength dispersion compensating element 28 may be omitted.

Figure 7:
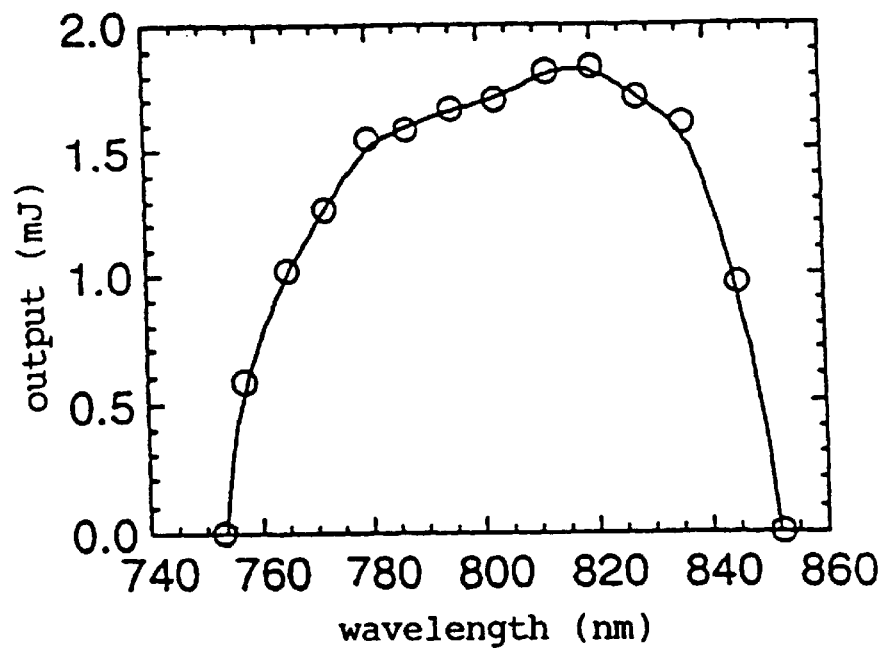
FIG. 7 is a graphical representation showing relationship between beam wavelengths and outputs of the ETT laser.

Using an ETT laser comprising a laser resonator provided with a wavelength dispersion compensating element 28 incorporated therein for keeping diffraction angle as shown in FIG. 6, laser beams were emitted at varied frequencies of a radio frequency (RF) power source 20. FIG. 7 shows relationship between wavelengths and outputs of the laser beams. Conditions of laser oscillation are as follows. Ti:Al$_2$O$_3$ was used as a laser medium 14, and second harmonic of a Nd:YAG laser, specifically, a pulsed laser beam having a pulse width of 8 ns and a wavelength of 532 nm was used as an excitation laser beam 24. The excitation laser beam had energy of 155 mJ per pulse. An exit mirror 112 had reflectance of 60%. and a total reflection mirror 110 exhibited reflectance of 99.9% at a wavelength of 800 nm. The RF power source 20 had a frequency tunable range 40 MHz to 150 MHz and was used at an output of 2W. The birefringent acousto-optic element 100 exhibited diffraction efficiency of 98%. As is apparent from FIG. 7, laser oscillation could be induced within a wavelength tunable range of about 750 nm to about 850 nm.

Figure 8:
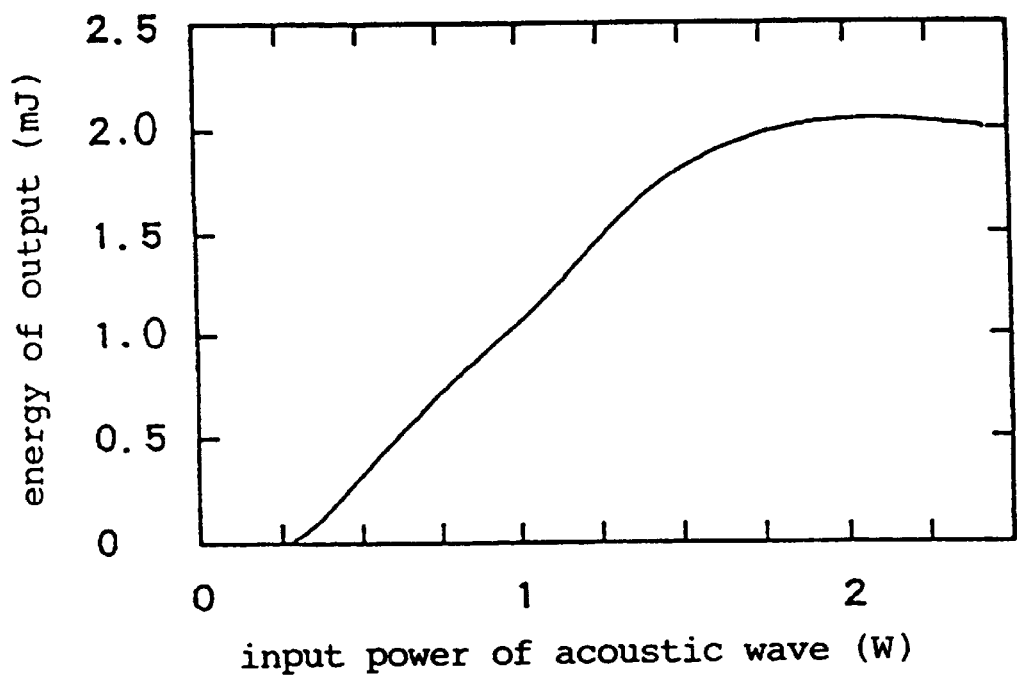
FIG. 8 is a graphical representation showing relationship between input power of an acoustic wave applied to the birefringent acousto-optic element and output of an emitted laser beam.

Output of the RF power source was changed to change acoustic wave applying power. FIG. 8 shows change in output of an emitted laser beam which resulted from the change in the acoustic wave applying power. It is seen from FIG. 8 that when the power of the acoustic wave applied to the birefringent acousto-optic element is changed from 0.5 W to 2 W, the output of the emitted laser beam is changed in response thereto. It is, therefore, understood that the output of the emitted laser beam can be controlled by changing the power of the acoustic wave applied to the birefringent acousto-optic element.

Figure 9:
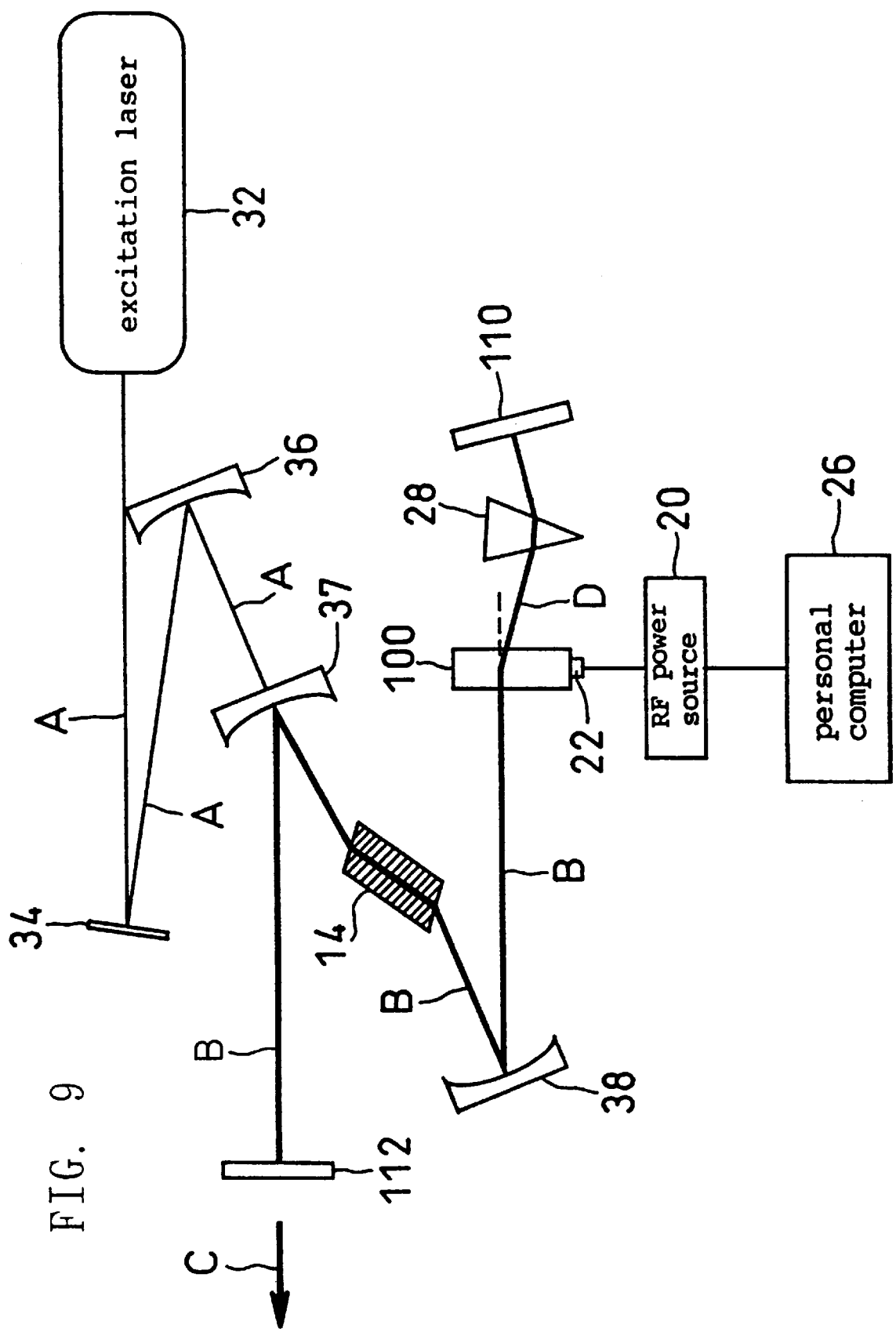
FIG. 9 is an illustrative view of still another form of the ETT laser.

FIG. 9 is a diagrammatic view showing another example of the ETT laser. In this example, a laser resonator of a so-called Z-hold type is used in which an optical path of light reciprocating in the laser resonator has a Z-shape. The Z-hold type laser resonator comprises an exit mirror 112 having a predetermined transmittance and a total reflection mirror 110. It further comprises a first intermediate mirror 37 which permits an excitation laser beam A to enter and reflects light B reciprocating between the exit mirror 112 and the total reflection mirror 110, and a second intermediate mirror 38 which reflects the light B reciprocating between the exit mirror 112 and the total reflection mirror 110. The light B reciprocating in the laser resonator has a Z-shaped optical path.

Between the first and second intermediate mirrors 37, 38 on the optical path in the laser resonator, a laser medium 14 having its incident light entering end subjected to Brewster-cut is disposed as a tunable laser medium in such a manner that the incident light entering end provides incidence at Brewster's angle at which reflectance of incident light becomes zero. Accordingly, the laser medium is so constructed as to induce laser oscillation by longitudinal coaxial excitation with the excitation laser beam A. Between the second intermediate mirror 38 and the total reflection mirror 110 on the optical path in the laser resonator, a birefringent acousto-optic element 100 is disposed as wavelength selecting means.

The birefringent acousto-optic element 100 is provided with a piezoelectric element 22 as acoustic wave applying means which is powered by a RF power source 20 frequency-controlled by a personal computer 26. The piezoelectric element 22 is activated by the RF power source 20, which is set at an intended frequency by the control of the personal computer 26, to generate an acoustic wave corresponding to the frequency in the birefringent acousto-optic element 100. The birefringent acousto-optic element 100 thereby diffracts light D having a frequency of $\omega o$ expressed by the above formula (1). The frequency $\omega a$ of the acoustic wave applied by the piezoelectric element 22 to the birefringent acousto-optic element 100 is controlled by the personal computer 26 so that the birefringent acousto-optic element 100 diffracts only light B having a wavelength (frequency $\omega i \approx \omega o$) corresponding to the intended wavelength of the emergent laser beam C emerging from the exit mirror 112 as the diffracted light D in a predetermined direction to induce laser oscillation.

Between the birefringent acousto-optic element 100 and the total reflection mirror 110, a prism 28 is disposed as a wavelength dispersion compensating element for compensating dispersion of the diffracted light D. By the use of the wavelength dispersion compensating prism 28 for keeping a diffraction angles direction of the emitted laser beam C is kept constant. As an excitation laser 32 for directing the excitation laser beam A into the laser resonator, a pulsed laser or a continuous-wave laser (Cw laser) may be employed.

The excitation laser beam A generated by the excitation laser 32 is reflected by a total reflection mirror 34 toward a total reflection converging mirror 36. The excitation laser beam A is converged and reflected by the total reflection converging mirror 36 and enters the laser medium 14 via the first intermediate mirror 37 to induce longitudinal coaxial excitation of the laser medium 14.

In the above arrangements to obtain the emergent laser beam C, the laser medium 14 is excited using the excitation laser beam A from the excitation laser 32. The frequency $\omega a$ of the RF power source 20 is controlled by the personal computer 26 according to the intended wavelength (frequency $\omega i$) of the emergent laser beam C emerging from the exit mirror 112. Of the light having a broad wavelength range which has emerged from the laser medium 14 and entered the birefringent acousto-optical element 100, the light having a frequency corresponding to that of the RF power source 20 is diffracted by the birefringent acousto-optical element 100 as the diffracted light D (frequency $\omega o$) The diffracted light D perpendicularly impinges upon the total reflection mirror 110 via the wavelength dispersion compensating prism 28 for keeping a diffraction angle constant, and it is reflected by the total reflection mirror 110 to reciprocate in the laser resonator along the Z-shaped optical path (It has an angular frequency of $\omega i$ at the laser medium 14). Accordingly, only the light having a wavelength corresponding to the frequency of the RF power source 20 is amplified to induce laser oscillation, thereby emitting the emergent laser beam C having the wavelength (frequency $\omega i$) from the laser resonator.

As described above, wavelength selection of the emergent laser beam C can be effected by selecting the frequency $\omega a$ of the RF power source 20 under the control of the personal computer 26, thereby enabling random wavelength selection of the emergent laser beam C (frequency $\omega i$) at a high speed. This leads to an increased wavelength tuning speed.

In the ETT laser shown in FIG. 9, which comprises the laser resonator constructed as a Z-hold type, the excitation laser beam A is converged and reflected by the total reflection converging mirror 36 in order to enter the laser medium 14. Accordingly, laser oscillation is attained even if the excitation laser beam A is emitted from a pulsed laser having low excitation power or a continuous-wave laser (CW laser) having low powers.

Figure 10:
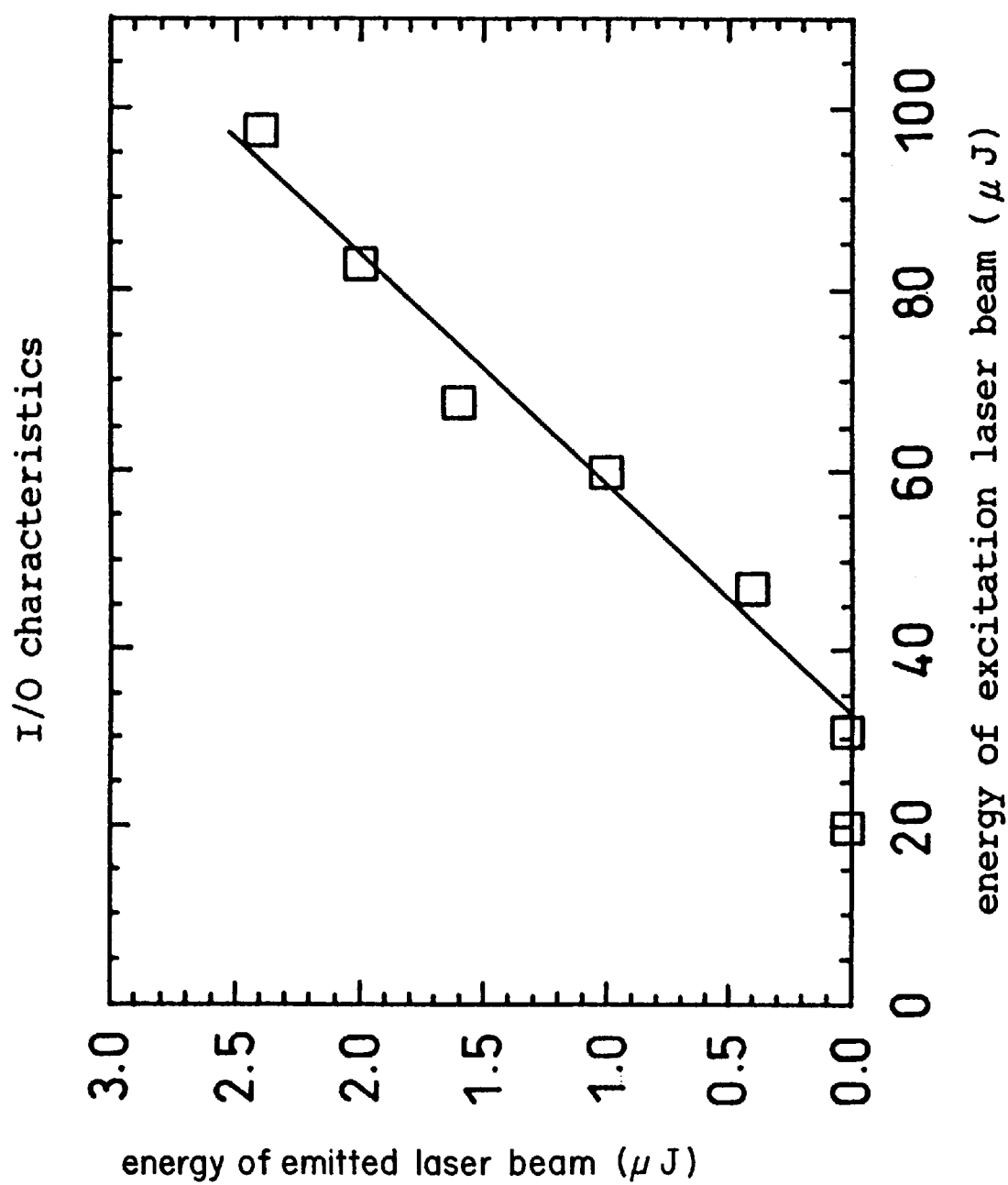
FIG. 10 is a graphical representation showing input/output characteristics between energy of an excitation laser beam and energy of an emitted laser beam when the ETT laser is excited by a pulsed laser.

FIG. 10 shows results of experiment on input-output (I/O) characteristics of the ETT laser shown in FIG. 9. In this experiment, a $Ti:Al_2O_3$ crystal was used as the laser medium 14, and a CW-Q switch pulsed Nd:YLF laser was used as the excitation laser 32 and the second harmonic thereof was used as the excitation laser beam A. The excitation laser beam A had a wavelength of 523 nm, and pulse repetition frequency was 1 kHz, and the maximum output per pulse was 200 $\mu J$. The total reflection converging mirror 36 had a diameter of 200 mm and each of the first and second intermediate mirrors 37, 38 had a radius of curvature of 100 mm. The exit mirror 112 exhibited reflectance of 97% (transmittance: 3%). An excitation area and a resonator mode diameter were each reduced by the laser medium 14 to a diameter of several tens $\mu m$, and the excitation laser beam A was converged upon the area by the total reflection converging mirror 36 to thereby attain increased excitation efficiency. FIG. 10 shows input-output characteristics showing relationship between energy of the excitation laser beam A (input) and energy of the emitted laser beam C (output) with the wavelength of the emitted laser beam C fixed at 800 nm. As is apparent from FIG. 10, laser oscillation started when the energy of the excitation laser beam A became about 40 mJ per pulse.

Figure 11:
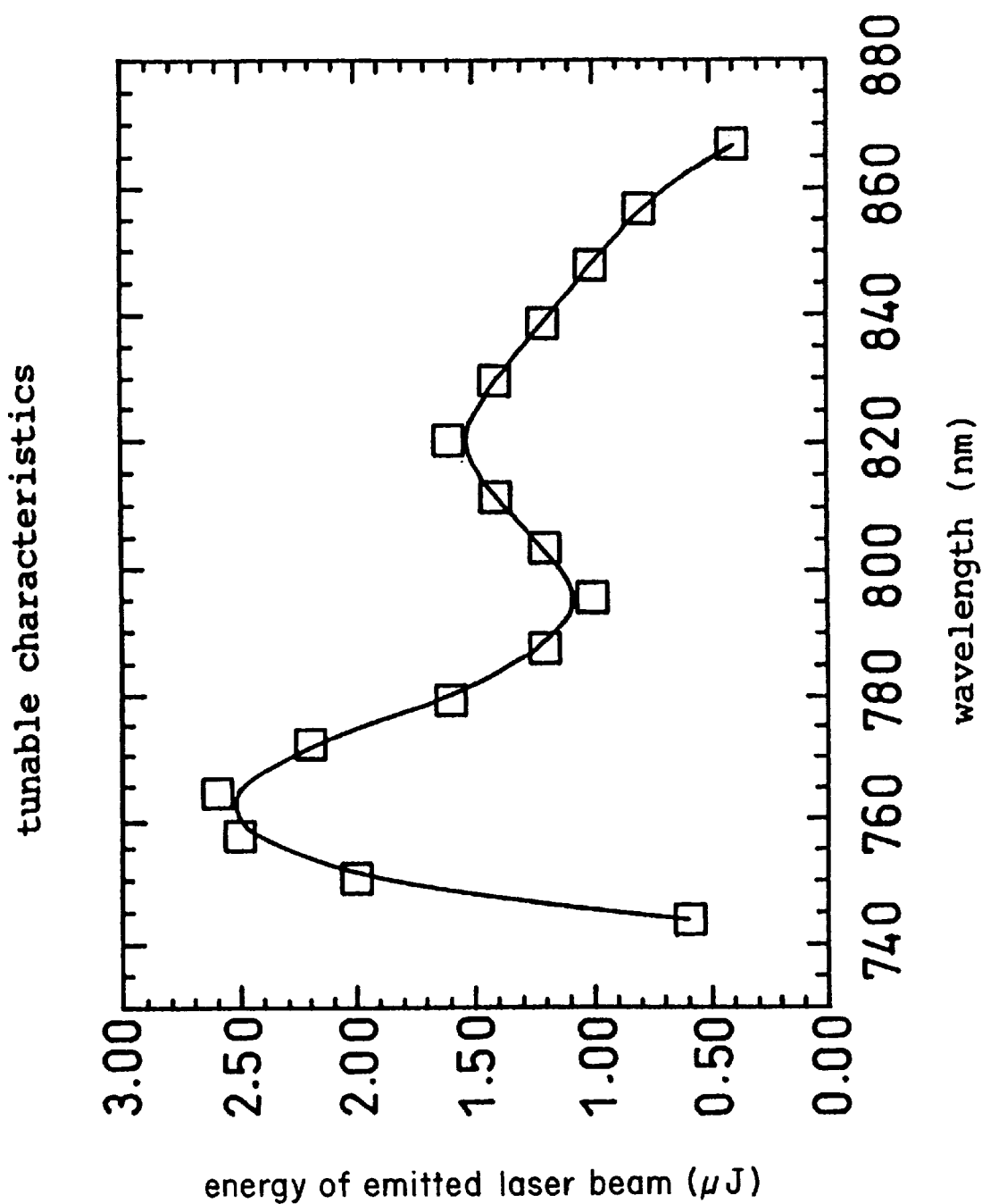
FIG. 11 is a graphical representation showing tunable characteristics of the ETT laser shown in FIG. 7.

FIG. 11 shows tunable characteristics when the energy of the excitation laser beam A is 100 $\mu J$. As is apparent from FIG. 11, the tunable range is from about 740 nm to about 870 nm. By providing the wavelength dispersion compensating prism 28 for keeping a diffraction angles beam deviation with the tuning of the laser was below observation limit.

Next, description will be given on the spectrometric method of the present invention which uses the above-described ETT laser.

Figure 12:
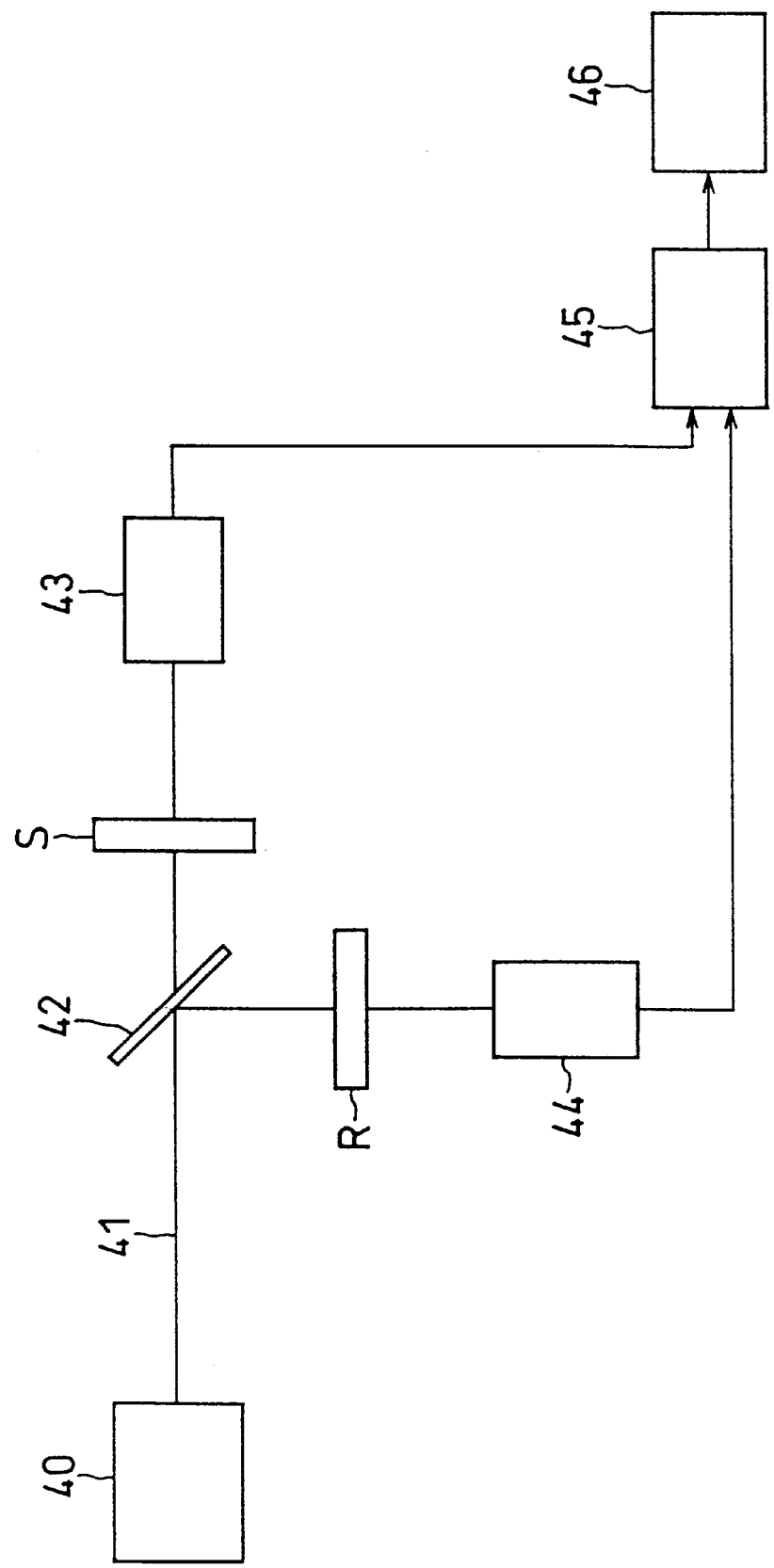
FIG. 12 is a diagrammatic view illustrating an embodiment of the spectrometric method according to the present invention.

FIG. 12 is a diagrammatic view illustrating one embodiment of the spectrometric method according to the present invention. The ETT laser 40 is used as a spectroscopic light source. As described above, the ETT laser 40 is a tunable laser comprising a laser resonator so provided therein with a laser medium capable of laser oscillation in a predetermined range of wavelength and a birefringent acousto-optic element as to perform laser oscillation with respect only to a beam component diffracted by the birefringent acousto-optic element, and the tunable laser is capable of wavelength selection by selecting a frequency of an acoustic wave to be generated in the birefringent acousto-optic element. For example, it is possible to derive therefrom monochromatic light in a wavelength range of about 680 nm to about 1100 nm by selecting titanium-containing sapphire as the laser medium. The ETT laser 40 may be one which generates a pulsed laser beam or one which generates a continuous laser beam.

A monochromatic laser beam 41 derived from the ETT laser and having a wavelength of $\lambda$ is divided in two by a half mirror 42. One enters a sample S, and the other enters a reference sample R. The light beam which has passed through the sample S is detected by a photodetector 43 such as a photomultiplier tube, and the light beam which has passed through the reference sample R is also detected by a photodetector 44. In an arithmetic section 45, logarithm of ratio between outputs of the two photodetectors 43, 44 is calculated to determine absorbance of the sample S at the wavelength $\lambda$. The result is shown in a display 46 such as a CRT. When an oscillation wavelength is swept $\lambda_1$ to $\lambda_2$, absorption spectrum of the sample S in a wavelength range of $\lambda_1$ to $\lambda_2$ can be obtained. Hereinabove, the explanation has been given on the measurement of absorption spectrum of the sample S. However, if the photodetector 43, 44 are disposed at positions for detecting lights reflected from the sample S and the reference sample R, respectively, reflection spectrum of the sample S can be measured.

The use of the ETT laser as a spectroscopic light source and the use of the laser beam as light incident on the sample enable a reduced diameter of the light incident on the sample and increased light intensity to be realized. Accordingly, it is possible to easily carry out local measurement of the sample and measurement of the sample in a very small amount.

Figure 13:
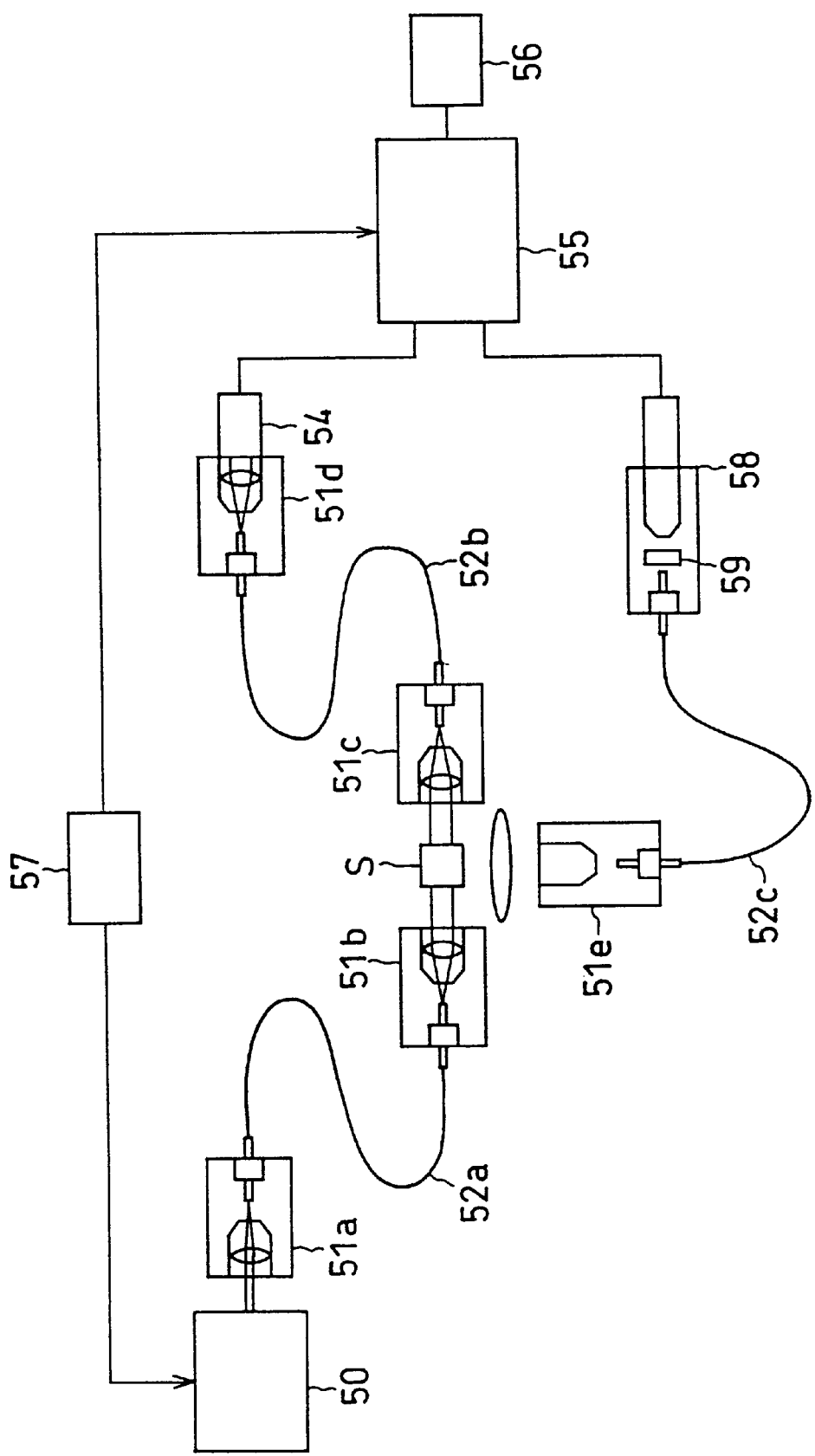
FIG. 13 is an illustrative view of an embodiment of the spectrometric method, which enables telemetrical measurement by connecting the ETT laser, a sample and photodetectors by means of optical fibers.

FIG. 13 is an illustrative view of an embodiment of the spectrometric method, which is capable of telemetrically measuring a sample S by connecting an ETT laser 50 as a spectroscopic light source with the sample S, the sample S with a photodetector 54, and the sample S with a photodetector 58 by means of optical fibers 52a, 52b and 52c, respectively.

A light beam emanated from the ETT laser 50 enters the light-transmitting optical fiber 52a via an optical coupler 51a and travels through the light-transmitting optical fiber 52a and emerges from an optical coupler 51b for irradiation located at the other end of the light-transmitting optical fiber 52a to irradiate the sample S. The light which has passed through the sample S enters the light-receiving optical fiber 52b via an optical coupler 51c for receiving light and emerges from an optical coupler 51d located at the other end of the light-receiving optical fiber 52b, and the emergent light is detected by the photodetector 54 such as a photomultiplier tube. Output detection signals of the photodetector 54 are inputted in a signal processor 55.

A control section 57 sends control signals to the ETT laser 50 and the signal processor 55. The control section thereby controls a frequency of an acoustic wave to be generated in a birefringent acousto-optic element of the ETT laser 50 to thereby induce oscillation of ETT laser at a desired wavelength. The signal processor 55 is informed of the wavelength of the laser beam, with which the sample is to be irradiated, by the control signals transmitted from the control section 57, and it calculates absorbance of the sample S at the wavelength. When the wavelength of the ETT laser 50 is swept, transmitted light absorption spectrum of the sample S can be measured.

When an optical coupler 51e for receiving light of the light-receiving optical fiber 52c is placed at an angle relative to an optical path of the optical coupler 51b for irradiation, scattered light or emitted light from the sample S can be measured. The light which has entered the optical coupler 51e for receiving light travels through the light-receiving optical fiber 52c and is received by the photodetector 58 provided with a filter 59. Output detection signals of the photodetector 58 are sent to the signal processor 55. Output of the signal processor 55 is sent to a display 56 such as a CTR. When the oscillation wavelength of the ETT laser 50 is swept, excitation spectrum can be measured.

The method, which comprises connecting the ETT laser 50 with the sample S, the sample S with the photodetector 54, and the sample S with the photodetector 58 by means of the optical fibers 52a, 52b and 52c, respectively, is effective in a case where it is required to place the apparatus for measurement 50, 54, 58, 55 and 56 at a distance from the sample S. As example of such a case, a case may be mentioned where concentration of a liquid running through a pipeline or sugar content of fruit transported by a conveyor is put under centralized control from a measuring room. According to the method, measurements of samples located at a plurality of positions can be put under centralized control in a measuring room located several tens meters or several hundreds meters apart from the positions of the measurements. Likewise, hemanalyses or the like on patients lying in an operation room or sick room in a hospital can also be put under centralized control in a monitoring room.

Figure 14:
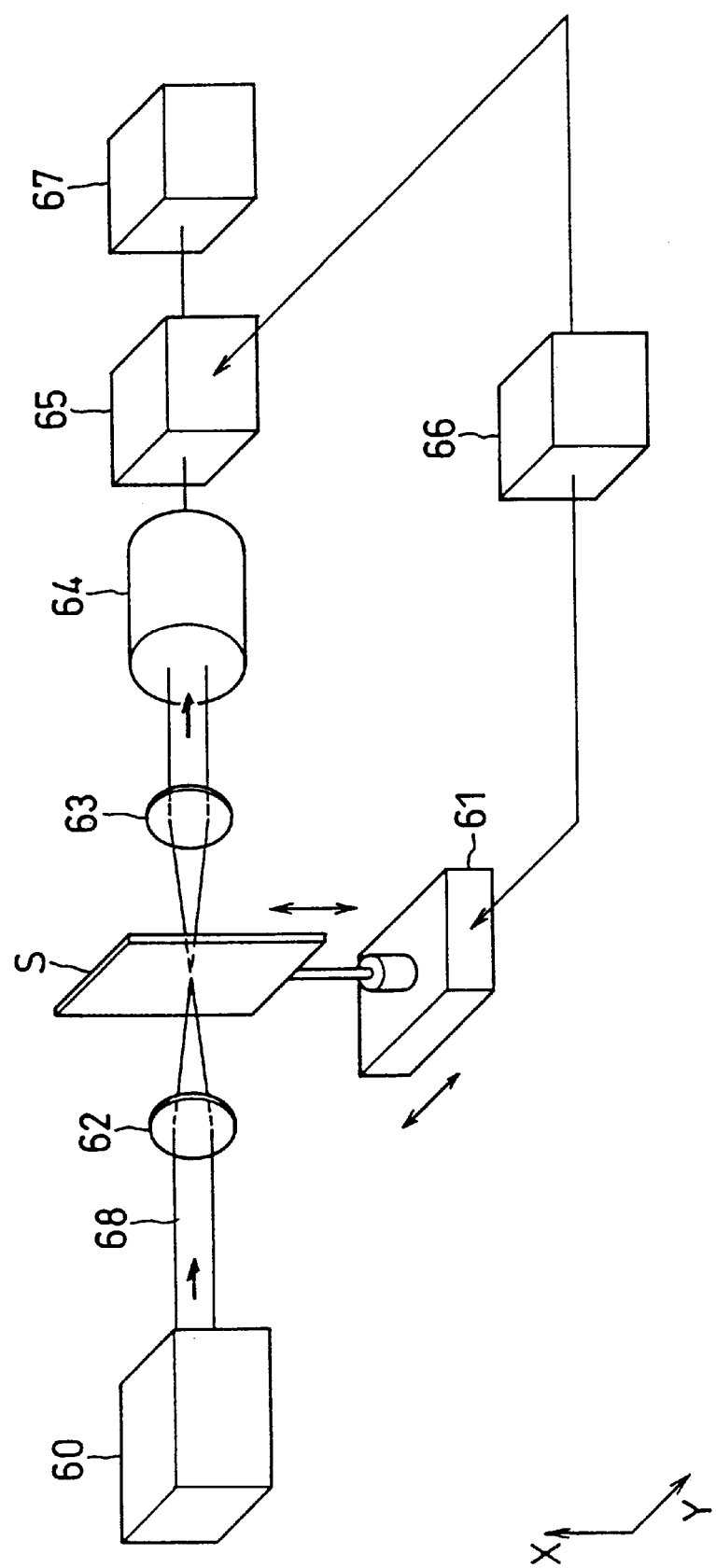
FIG. 14 is a diagrammatic view illustrating measurement of two-dimensional distribution of a specific component in a sample.

FIG. 14 is a diagrammatic view illustrating an embodiment of the method according to the present invention for measuring two-dimensional distribution of a specific component in a sample.

A sample S is held by a sample carrier 61 and movable in X and Y directions by driving means such as motor incorporated in the sample carrier 61. A monochromatic laser beam 68 emitted from an ETT laser 60 is narrowly converged by a converging lens 62 to spot-irradiate a minute area in the sample S therewith. The laser beam which has passed through the minute area of the sample S is condensed by a condenser lens 63 and enters a photodetector 64 and detected thereby. Output signals of the photodetector 64 are processed in a signal processor 65 and then output signals of the signal processor are sent to a monitor 67 such as a CTR. Position of irradiation with the monochromatic laser beam 68 in the sample S is controlled by moving the sample carrier 61 in X and/or Y direction by means of a control section 66. Information on the control of the sample carrier 61 is also sent from the control section 66 to the signal processor 65.

For example, the sample carrier 61 is step-wise or continuously moved by the control section 66. In the course of this, the monochromatic laser beam 68 is quickly changed to a dual-wavelength beam having a measurement wavelength $\lambda s$ and a reference wavelength $\lambda r$ at each controlled position to measure intensity of light transmitted by the sample at each of the wavelengths $\lambda s$ and $\lambda r$. The measurement wavelength $\lambda$ is a wavelength at which light is strongly absorbed by an intended component in the sample S, and the reference wavelength $\lambda r$ is a wavelength at which light is not absorbed by the intended component. By calculating the intensities of light transmitted by the sample at the two wavelengths, concentration of the intended component contained in the minute area of the sample S can be determined. In this manner, the positions of irradiation with the laser beam are two-dimensionally scanned. It is thereby possible to display a two-dimensional distribution of the intended component in the sample S on the monitor 67.

Figure 15:
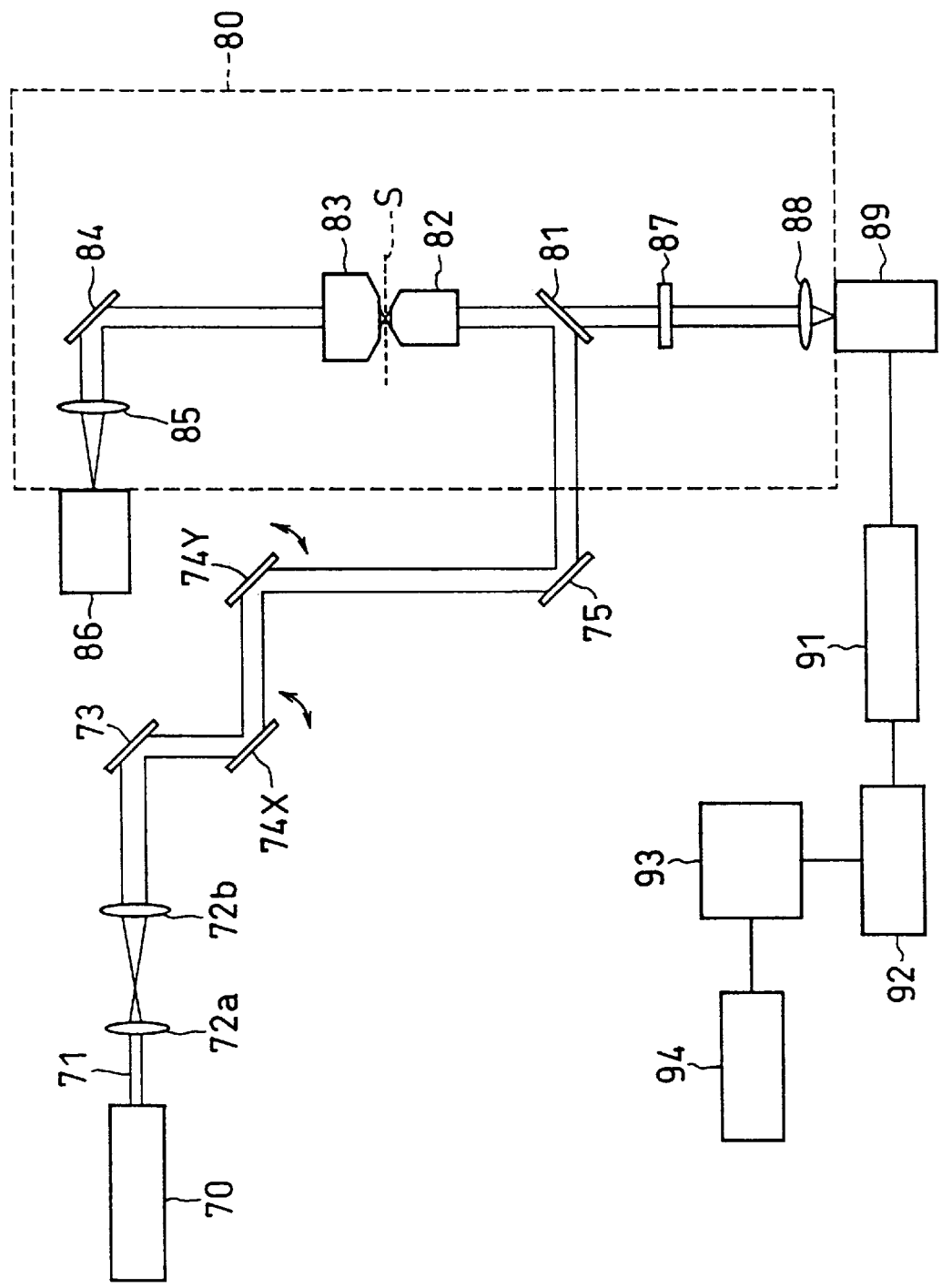
FIG. 15 is a diagrammatic view illustrating another embodiment of two-dimensional measurement of a sample.

FIG. 15 is a diagrammatic view illustrating another embodiment of the method according to the present invention for two-dimensional measurement of a sample. In this embodiment, a monochromatic light beam from an ETT laser is introduced into a microscope, and two-dimensional distribution of light transmitted or emitted by a cell preparation or the like is measured by means of a two-dimensional detector.

A monochromatic laser beam 71 from an ETT laser 70 is magnified in its beam diameter by a lens system 72a, 72b and reflected by a reflecting mirror 73. Then, the monochromatic laser beam 71 is adjusted its beam axis by a galvano-mirror 74X which directs the beam to the X direction and a galvano-mirror 74Y which directs the beam to the Y direction and then reflected by a reflecting mirror 75, thereby being introduced into a microscope 80.

The monochromatic laser beam introduced in the microscope 80 is reflected by a dichroic mirror 81 to impinge upon a sample S through an objective lens 82. The laser beam which has passed through the sample S is condensed by a condenser lens 83 and reflected by a reflecting mirror 84 and then introduced by an image forming lens 85 into a detector 86 such as a photomultiplier tube. On the other hand, emitted light emanating from the sample S, for example, fluorescence is transmitted by the dichroic mirror 81 and an excitation beam cut-off filter 87 and then introduced by an image forming lens 88 into a detector 89 such as a photomultiplier tube.

Output signals of the detector 86 or 89 are inputted in an image processor 91. Positional information obtained by operations of the galvano-mirrors 74X and 74Y and the output information of detector 86 or 89 are together processed into two-dimensional image signals. The image signals form the image processor 91 are stored in VTR 92 and displayed on a monitor 93. The image of the sample displayed on the monitor 93 may be sent to a printer 94. Further, if the laser beam is rapidly swept and two-dimensional detector such as a CCD camera is used instead of the photomultiplier, a two-dimensional image is directly obtained.

The ETT laser 70 is capable of providing a monochromatic laser beam having a desired wavelength and permits rapid change of wavelength, and accordingly, it is effective for differential spectrophotometry in which very small amount of change in absorption or emission can be detected.

Figure 16:
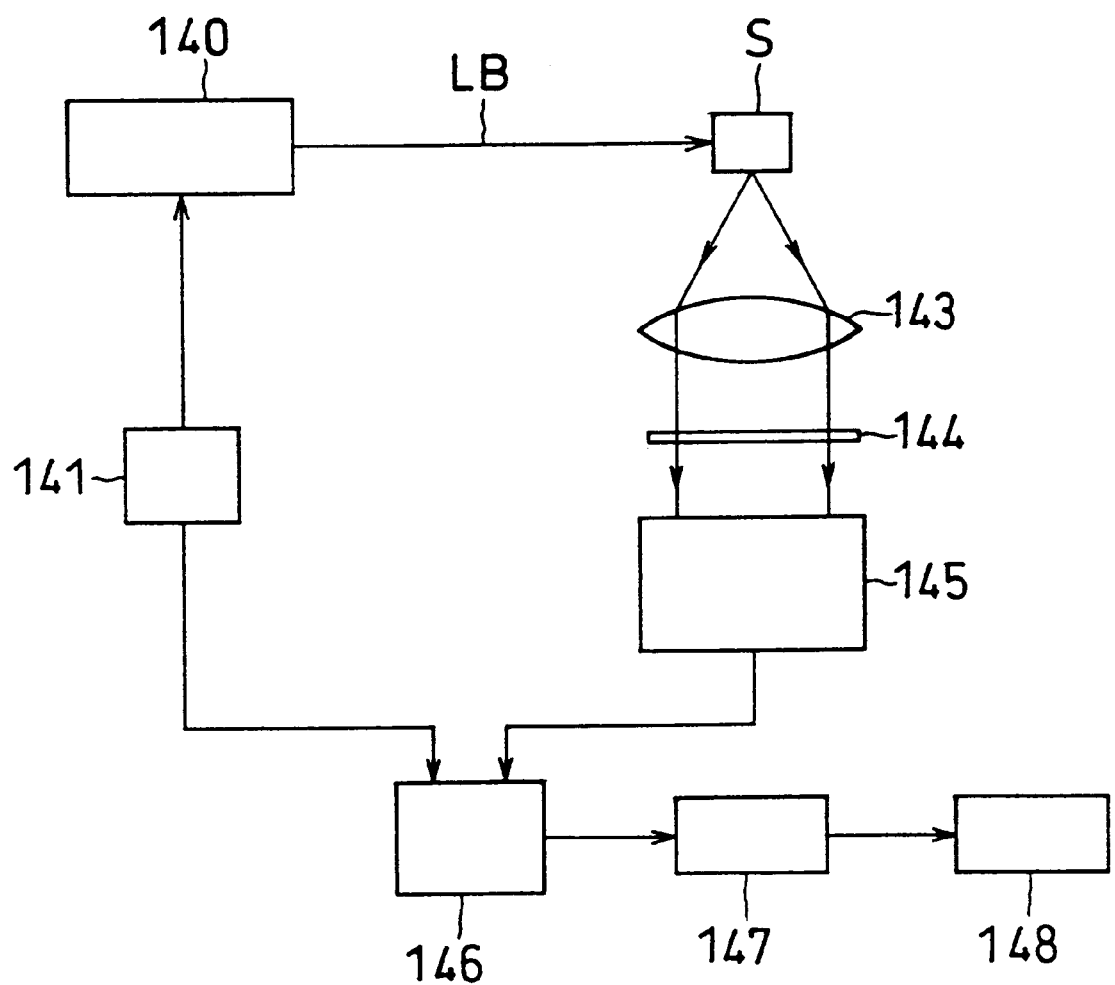
FIG. 16 is a diagrammatic view showing structure of an embodiment of the apparatus for spectroscopic analysis according to the present invention.

The measuring method according to the present invention by means of the laser is a general absorption/emission measuring method having no particular restriction with respect to measuring objects. As examples of measuring object characteristic of the oscillation wavelength of the lasers there may be mentioned hemoglobin in bloods silicone and the like. With respect to the former, amount of oxygen can be analyzed by spectrum analysis around a wavelength of 740 nm. With respect of the latter, by utilizing the fact that absorption is greatly changed in a wavelength range of 700 nm to 1100 nm, position and depth of defect in a silicon wafer can be determined FIG. 16 is a diagrammatic view showing structure of another embodiment of the apparatus for spectroscopic analysis according to the present invention. A monochromatic laser beam LB emitted from a tunable laser 140 enters a sample S. The resulting scattered light emanated from the sample S is collimated by a collimator lens 143 and then impinges upon a narrow-band-pass filter 144 such as an interference filter which transmits only light beams having frequencies in a narrow-band-centering around a frequency of $\upsilon_{ob}$. The light transmitted by the narrow-band-pass filter 144 is detected by a photodetector 145 such as a photomultiplier tube. Output of the photodetector 145 is transmitted to a lock-in amplifier 146. Output of the lock=in amplifier 146 is transmitted to a signal processor 147, and the result of signal processing is shown on a display 148 such as a CRT.

On the other hand, the tunable laser 140 is subjected to wavelength switching under control of a controlling device 141 so as to alternately oscillate at two frequencies, i.e., a first frequency $\upsilon_{ex1}$ and a second frequency $\upsilon_{ex2}$ having a frequency difference $\Delta\upsilon_{ex}$ relative to the first frequency $\upsilon_{ex1}$. The first and second frequencies $\upsilon_{ex1}$ and $\upsilon_{ex2}$ are swept toward higher or lower frequencies while maintaining the frequency difference $\Delta\upsilon_{ex}$ constant. The frequency difference $\Delta\upsilon_{ex}$ between the first and second frequencies $\upsilon_{ex1}$ and $\upsilon_{ex2}$ may have any value. In general, however, it is so selected as to be slightly broader than Raman spectral band width. The control signals from the controlling device 141 are also inputted to the lock-in amplifier 146 as synchronizing signals.

Figure 17:
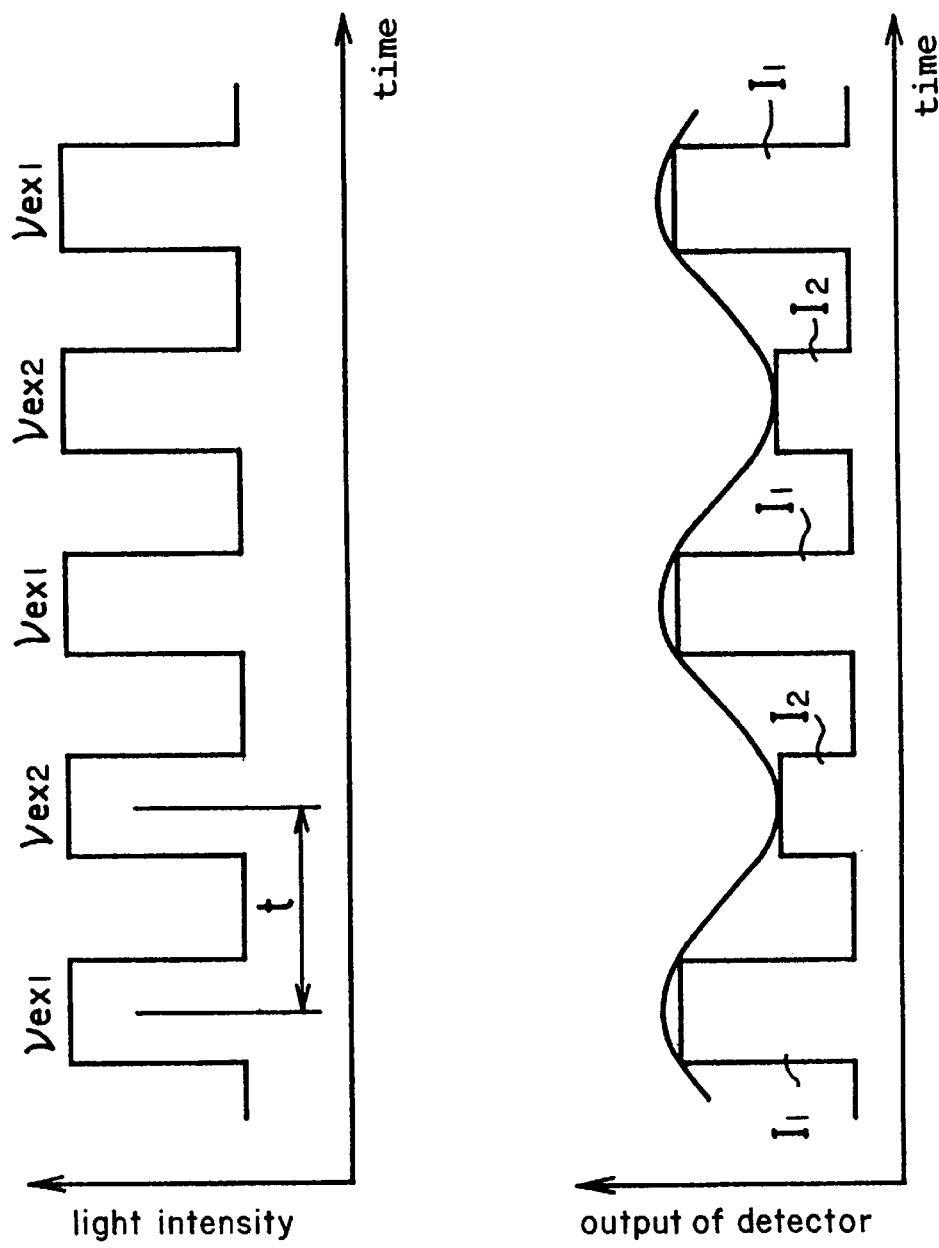
FIG. 17(a) is a graphical representation diagrammatically showing output of a tunable laser.
FIG. 17(b) is a graphical representation diagrammatically showing output signals of a detector.

FIG. 17(*a*) is a graphical representation diagrammatically showing output of the tunable laser 140. The axis of abscissa is a time base. As shown in FIG. 17(*a*), the tunable laser 140 performs alternate laser oscillation at the first frequency 98 $_{ex1}$ and the second frequency $\upsilon_{ex2}$ (=$\upsilon_{ex1}$+$\Delta\upsilon_{ex}$) under the control of the controlling device 141. The tunable laser 140 used in the present invention is capable of wavelength switching between the two wavelengths at a wavelength switching frequency f (=1/t) of the order of 1 ms.

FIG. 17(*b*) is a graphical representation diagrammatically showing output signals of the detector 145. Light detected by the detector 145 is the scattered light components having frequencies in the narrow-band centering around the third frequency $\upsilon_{ob}$ (fixed frequency) which have passed through the narrow-band-pass filter 144. Outputs $I_1$ correspond to detection signals of the scattered light emitted from the sample S irradiated with the laser beam LB having the first frequency $\upsilon_{ex1}$, outputs $I_2$ correspond to detection signals of the scattered light emitted from the sample S irradiated with the laser beam LB having the second frequency.

Figure 1A:
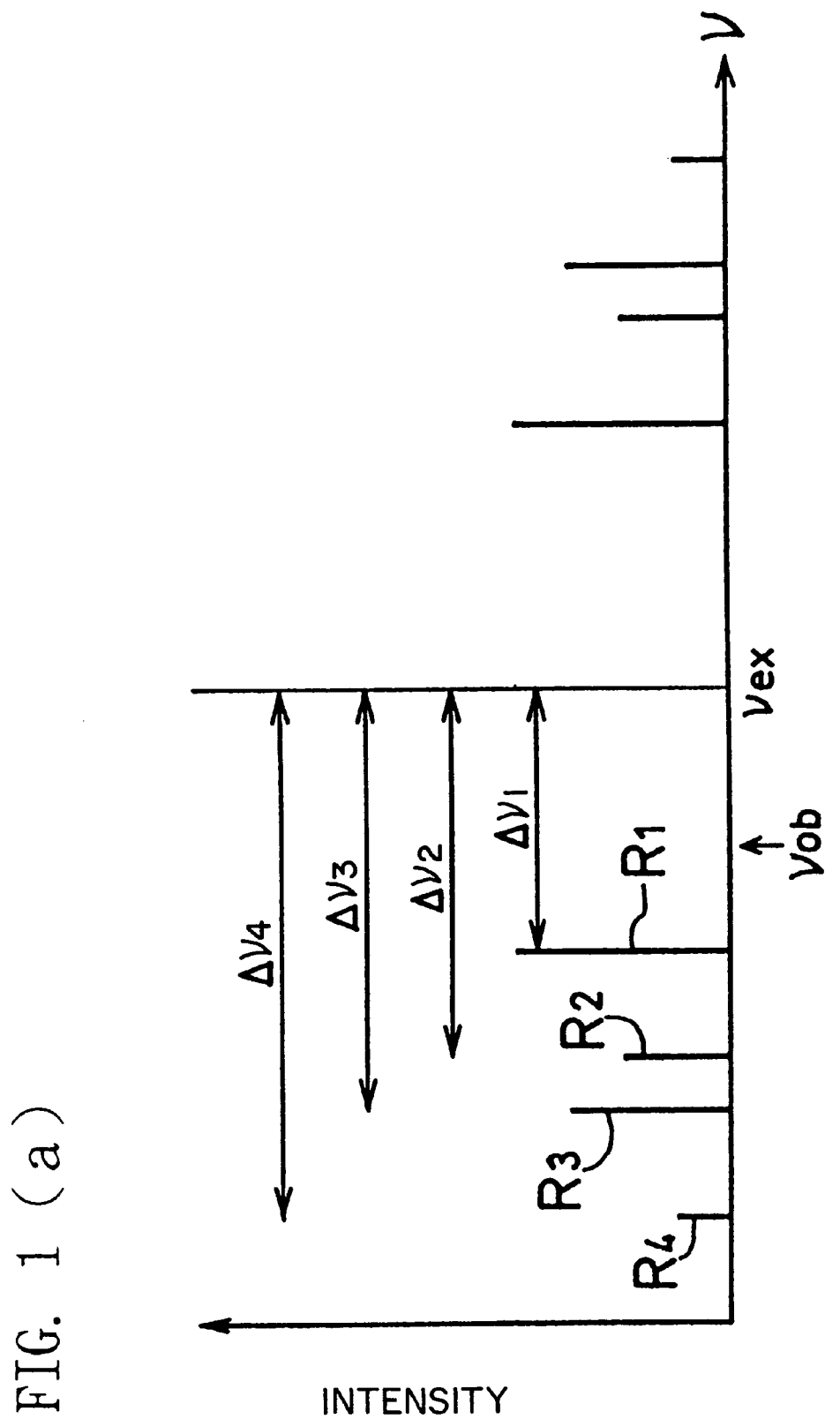
FIGS. 1(a) to (c) are diagrammatic representations of Raman spectra with no emission of fluorescence from a sample.
Figure 1B:
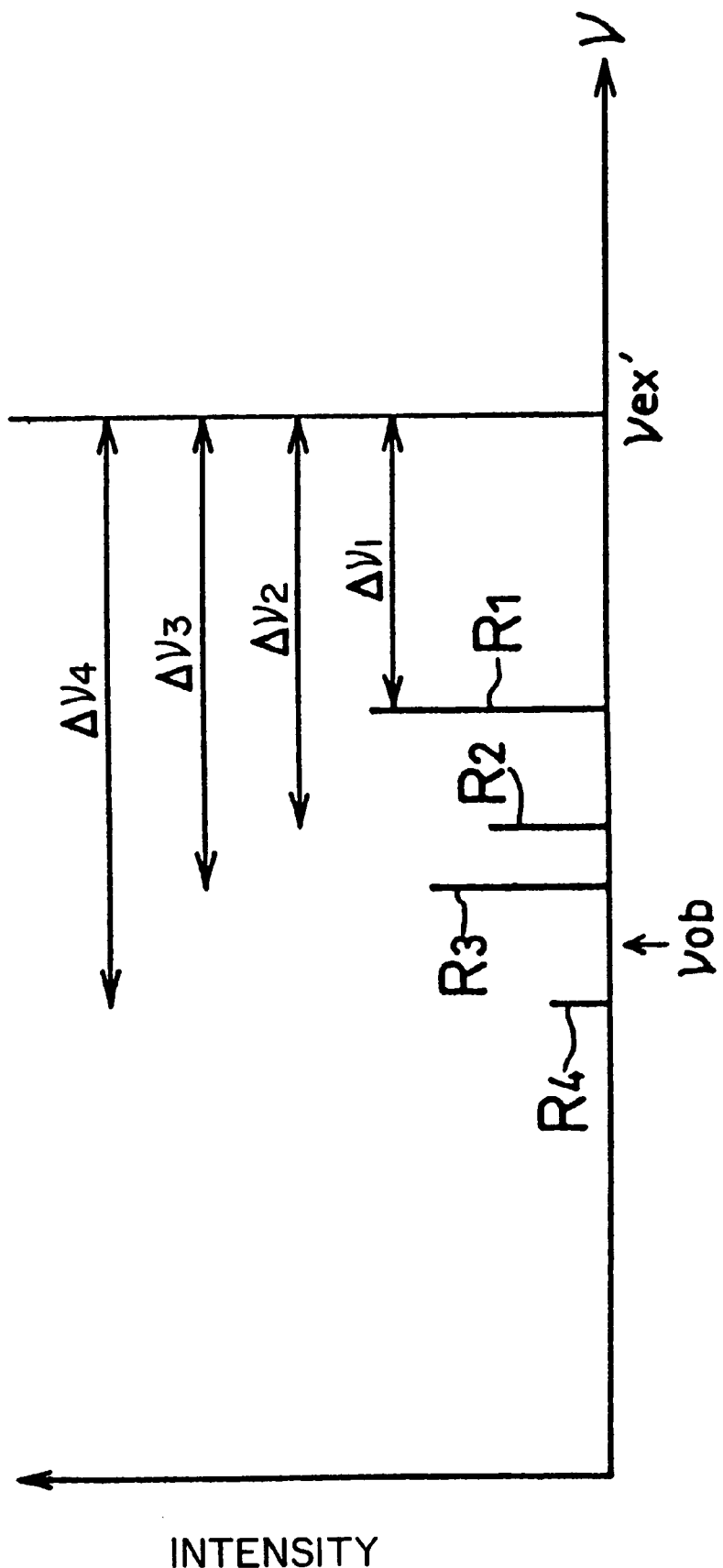
Figure 1:
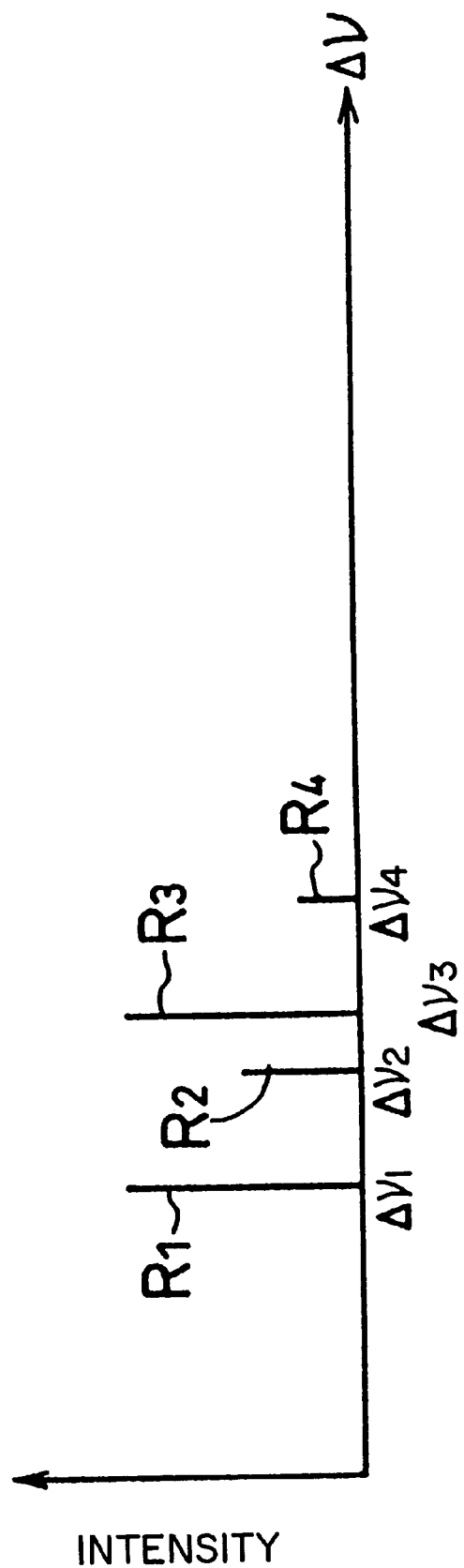
Figure 2:
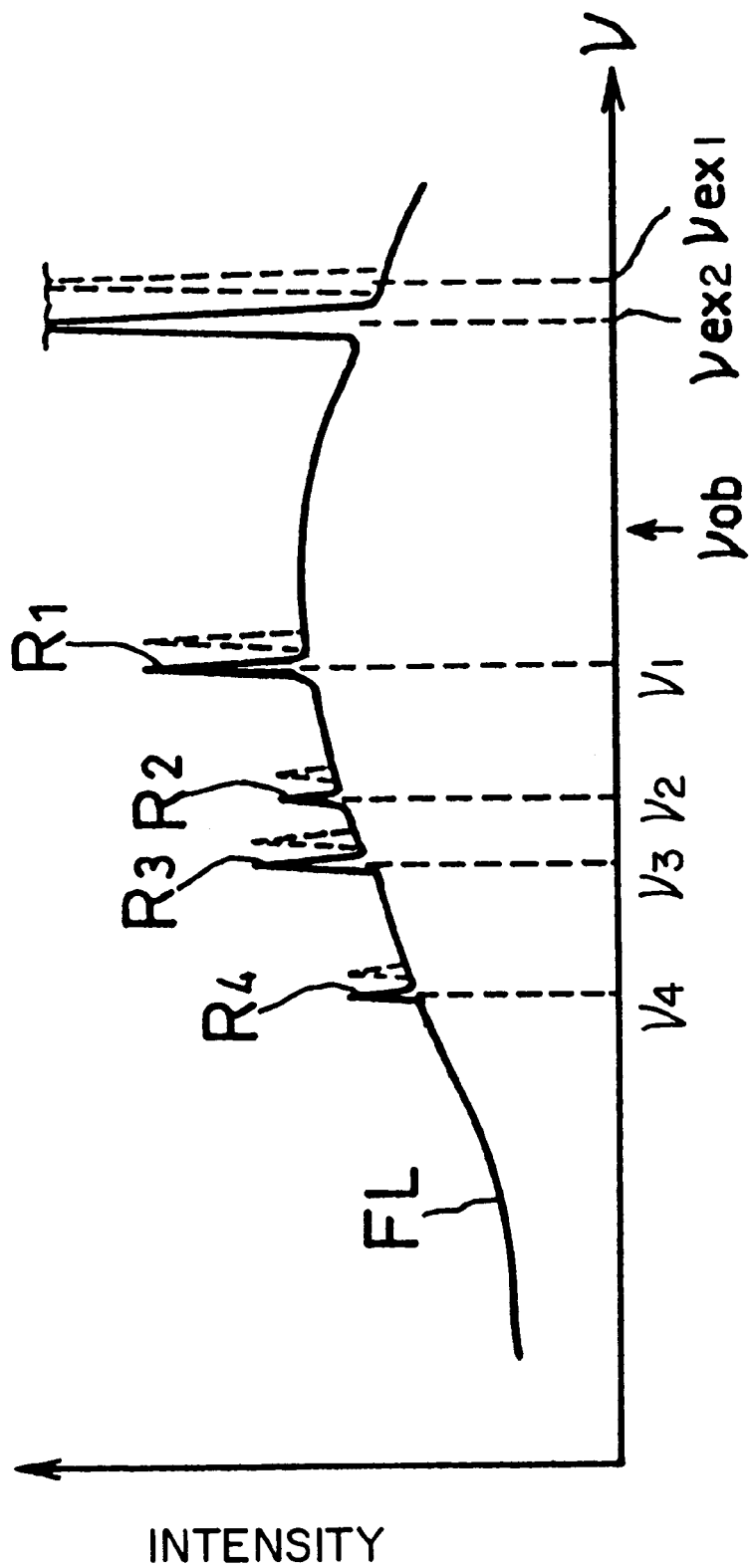
FIGS. 2(a) to (c) are schematic representations of spectra with superimposition of fluorescence upon Raman lines.

If the frequency of the excitation light is alternately changed between the first frequency $\upsilon_{ex1}$ and the second frequency $\upsilon_{ex2}$, intensity of fluorescence transmitted by the narrow-band-pass filter 144 and then detected by the photodetector 145 shows no substantial change. Accordingly, contribution of the fluorescence to the output $I_1$ and contribution of the fluorescence to the output $I_2$ are substantially equal to each others On the other hand, as shown in FIG. 2(*a*), a frequency of Raman scattered light is changed in response to the change in the frequency of the excitation light. For examples even if a frequency of a Raman line which is derived from excitation with the laser beam LB having the first frequency $\upsilon_{ex1}$ coincides with the observation frequency $\upsilon_{ob}$ and thus is detected by the photodetector 145, a frequency of a Raman line which is derived from excitation with the Laser beam LB having the second frequency $\upsilon_{ex2}$ does not coincide with the observation frequency $\upsilon_{ob}$ because of the difference $\Delta\upsilon_{ex}$ larger than Raman spectral band width and thus is not detected by the detector 145. In other words, the Raman scattered light contributes to the detection output $I_1$ but does not to the detection output $I_2$. Accordingly, as schematically shown in FIG. 17(*b*), Raman components can be separated (extracted) from the detection signals of the detector 145 and measured by subjecting signal components with frequency of f/2 to phase synchronous detection by means of the lock-in amplifier 146.

To measure a Raman spectrum, the wavelength of the monochromatic laser beam LB which is generated by the tunable laser 140 is continuously swept toward the higher or lower frequencies while being switched between the first frequency $\upsilon_{ex1}$ and the second frequency $\upsilon_{ex2}$ with the wavelength difference $\Delta\upsilon_{ex}$ between the two frequencies kept constant.

Figure 18:
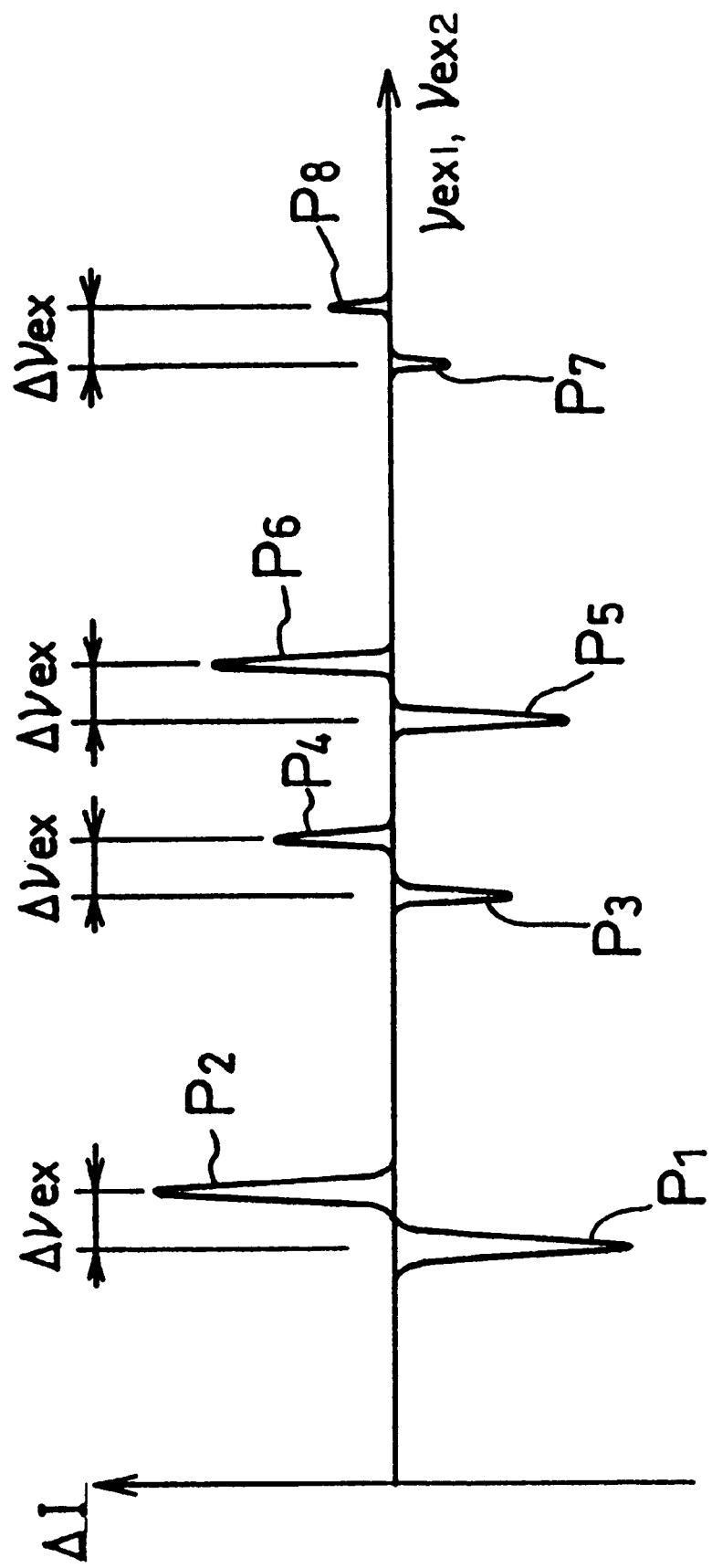
FIG. 18 is a schematic view showing output of a lock-in amplifier.

FIG. 18 is a schematic view showing output of the lock-in amplifier 146 which is obtained when such wavelength sweeping is carried out. When a Raman line derived from the excitation frequency $\upsilon_{ex1}$ or $\upsilon_{ex2}$ is observed at the frequency of $\Delta\upsilon_{ob}$, the following relationship expressed by formula (3) is satisfied.

$$\Delta\upsilon_R = \upsilon_{ex1} - \upsilon_{ob}, \text{ or}$$

$$\Delta\upsilon_R = \upsilon_{EX2} - \upsilon_{ob} \qquad (3)$$

wherein $\Delta\upsilon_R$ represents a Raman shift of a Stokes line.

Accordingly, when the frequency of the laser beam of the tunable laser 140 is swept and the frequency $\upsilon_{ex1}$ or $\upsilon_{ex2}$ satisfies the above resonance relationship expressed by the formula (3), a remarkable Raman signal $\Delta I$ is obtained. If the lock-in amplifier 146 for phase synchronous detection is set such that $\Delta I>0$ when resonance occurs at the frequency $\upsilon_{ex1}$ and that $\Delta I<0$ when resonance occurs at the frequency $\upsilon_{ex2}$, positive peaks $P_2$, $P_4$, $P_6$ and $P_8$ in FIG. 18 are attributable to the resonance at the frequency $\upsilon_{ex1}$ and negative peaks $P_1$, $P_3$, $P_5$ and $P_7$ are attributable to the resonance at the frequency $\upsilon_{ex2}$. With respect to one Raman line, a pair of positive and negative peaks appearing at an interval of the constant frequency difference $\Delta v_{ex}$ ($v_{ex1}-v_{ex2}$) is obtained from the lock-in amplifier 146. Likewise, with respect to different Raman lines, peak pairs such as ($P_1$, $P_2$), ($P_3$, $P_4$), ($P_5$, $P_6$) and ($P_7$, $P_8$) are obtained.

A signal processor 147 re-arranges signals of a series of the positive peaks $P_2$, $P_4$, $P_6$ and $P_8$ which are outputted from the lock-in amplifier 146 taking as the axis of abscissa the difference $\Delta v$ ($=\Delta v_{ob}-\Delta v_{ex}$) between the observation frequency $v_{ob}$ and the excitation frequency $\Delta v_{ex1}$ at which each of the peaks appears, and the result is shown on a display 148 as a Raman spectrum of the sample S. Instead of the signals of a series of the positive peaks, signals of a series of the negative peaks may be subjected to the same processing to obtain the same Raman spectrum. Further, the wave of the Raman spectrum obtained from the signals of a series of the positive peaks $P_2$, $P_4$, $P_6$ and $P_8$ and the wave of the Raman spectrum obtained from the signals of a series of the negative peaks $P_1$, $P_3$, $P_5$ and $P_7$ may be compared in the signal processor 147 to output only overlapping portions therebetween to the display 148 as a Raman spectrum In this case, non-overlapping portion between the two waves may be regarded as noise.

Figure 19:
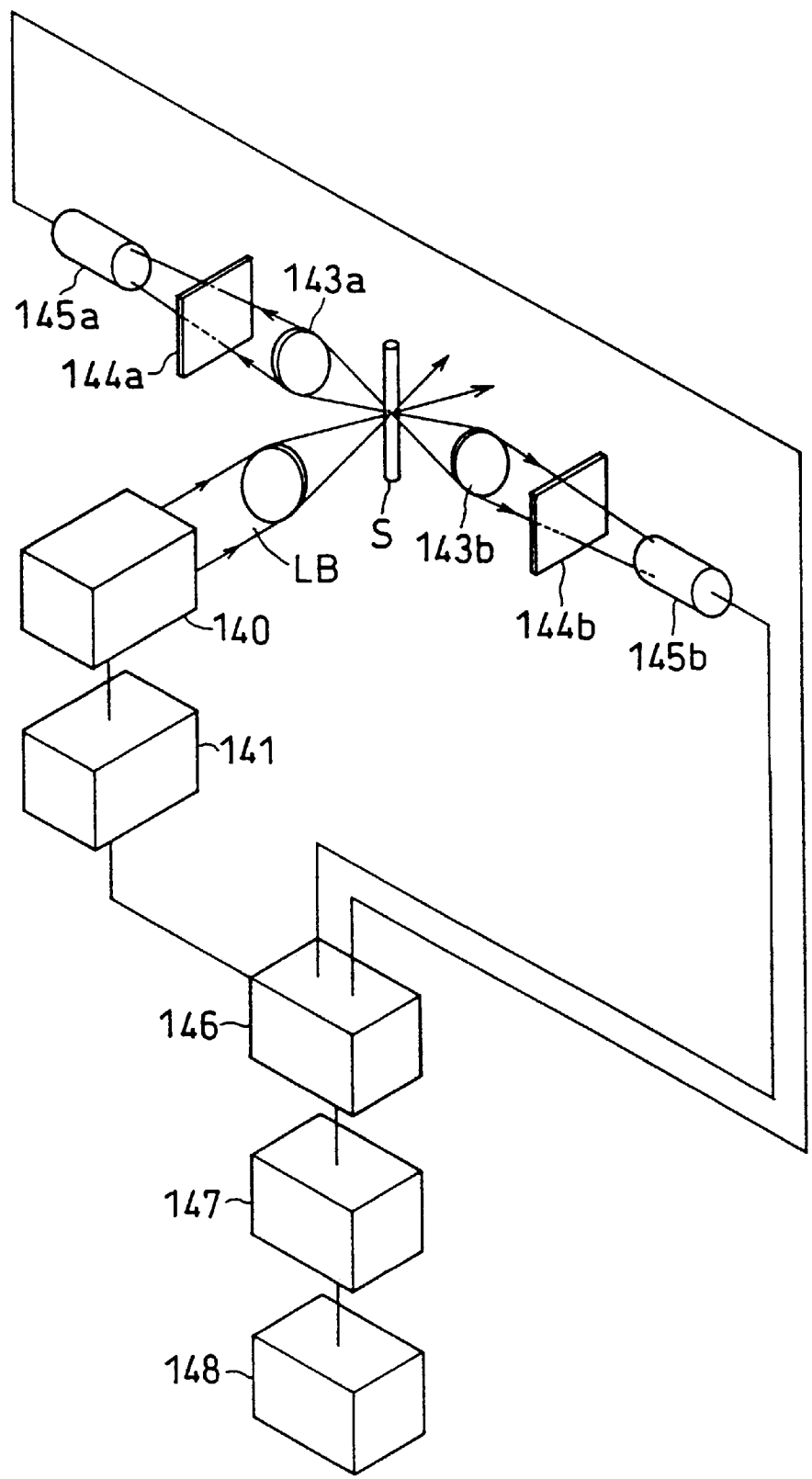
FIG. 19 is a diagrammatic view showing structure of an embodiment of the apparatus for spectroscopic analysis which uses two observation frequencies.

FIG. 19 is a diagrammatic view showing structure of an embodiment of the apparatus for spectroscopic analysis which observes scattered light at two frequencies to further increase precision of Raman spectrum measurement.

A tunable laser 140 such as an ETT laser alternately oscillates at first and second frequencies $v_{ex1}$ and $v_{ex2}$ under control of a controlling device 141. The second frequency $v_{ex2}$ has a frequency difference $\Delta v_{ex}$ relative to the first frequency $v_{ex1}$. The first and second frequencies $v_{ex1}$ and $v_{ex2}$ are swept toward higher or lower frequencies while maintaining the frequency difference $\Delta v_{ex}$ constant.

A monochromatic laser beam LB emitted from the tunable laser 140 enters a sample S. The resulting scattered light emanated from the sample S is collimated by a collimator lens 143a and then impinges upon a narrow-band-pass filter 144a such as an interference filter which transmits only light beams having frequencies in a narrow-band centering around a frequency of $v_{ob1}$. The light transmitted by the narrow-band-pass filter 144a is detected by a photodetector 145a such as a photomultiplier tube. The scattered light emanated from the sample S is also collimated by a collimator lens 143b and then impinges upon a narrow-band-pass filter 144b which transmits only light beams having frequencies in a narrow-band centering around a second frequency $v_{ob2}$ different from the frequency $v_{ob1}$. The light transmitted by the narrow-band-pass filter 144b is detected by a photodetector 145b. Outputs of the photodetectors 45a, 45b are transmitted to a lock-in amplifier 146.

The lock-in amplifier 146 uses control signals of the controlling device 141 as synchronizing signals to perform phase synchronous detection of the output signals of the photodetectors 145a, 145b. From output signals of the lock-in amplifier 146 as a result of the phase synchronous detection of the output signals of the photodetector 145a, a Raman spectrum of the sample S is obtained by means of a signal processor 147 in the same manner as described in the previous embodiment. Likewise, a Raman spectrum of the sample S is obtained from output signals of the lock-in amplifier 146 as a result of the phase synchronous detection of the output signals of the photodetector 145b. The two Raman spectra are compared, and of these, one having a stronger correlation with the wavelength difference is regarded as a proper Raman spectrum and the other having a weaker correlation with the wavelength difference is regarded as noise. A spectrum from which the noise is removed is shown on a display 148 such as a CRT. According to this apparatus for spectroscopic analysis, precision in measurement of a Raman spectrum can be increased to thereby obtain a precise Raman spectrum of a sample, and observation time can be reduced.

Figure 20:
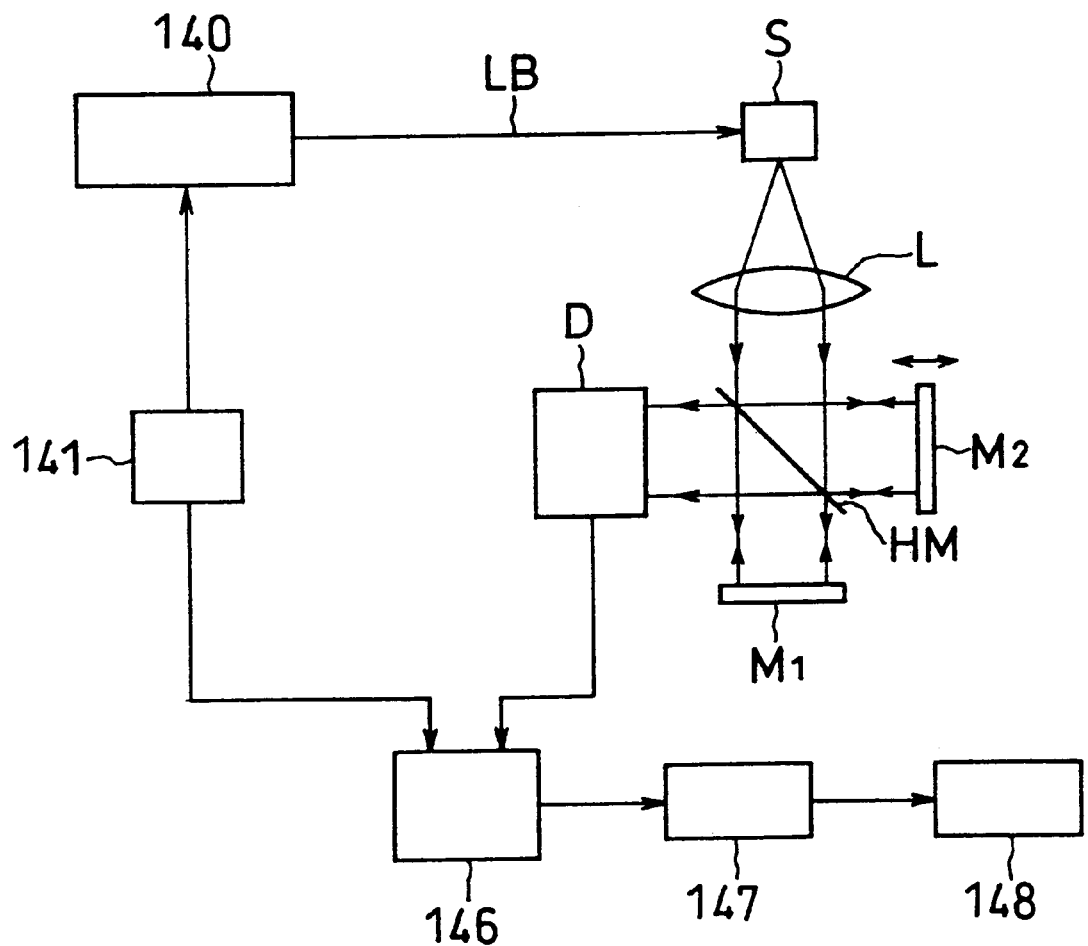
FIG. 20 is a diagrammatic view showing structure of an embodiment of the apparatus for spectroscopic analysis which uses an interference spectroscope.

FIG. 20 is a diagrammatic view showing structure of an embodiment of the apparatus for spectroscopic analysis according to the present invention which uses an interference spectroscope.

A tunable laser 140 such as an ETT laser alternately oscillates at first and second frequencies $v_{ex1}$ and $v_{ex2}$ under control of a controlling device 141. The second frequency $v_{ex2}$ has a frequency difference $\Delta v_{ex}$ relative to the first frequency $v_{ex1}$. The first and second frequencies $v_{ex1}$ and $v_{ex2}$ are swept toward higher or lower frequencies while maintaining the frequency difference $\Delta v_{ex}$ constant.

A laser beam LB emitted from the tunable laser 140 and alternately switched between two oscillation wavelengths of $\lambda_1$ and $\lambda_2$ enters a sample S. The resulting scattered light emanated from the sample S is collimated by a collimator lens L and then enters an interference spectroscope comprising a fixed mirror $M_1$, a movable mirror $M_2$, and a half mirror HM. The scattered light from the sample S is splitted by the half mirror EM into a component incident upon the fixed mirror $M_1$ and a component incident upon the movable mirror $M_2$, and the component reflected by the fixed mirror $M_1$ and the component reflected by the movable mirror $M_2$ are re-combined by the half mirror HM to cause interference in a photodetector D.

The control signals are also inputted to a lock-in amplifier 146 and the lock-in amplifier 146 performs phase synchronous detection of output signals of the photodetector D at a frequency f of the wavelength switching of the alternate oscillation The difference $\Delta\lambda(=\lambda_1-\lambda_2)$ in wavelength is small, and Raman scattered light is shifted but fluorescence is not shifted by the wavelength switching. Accordingly, the synchronously detected component is output component attributable to Raman scattering. The output of the lock-in amplifier 146 is transmitted to a signal processor 147 and detected while being swept by moving the movable mirror $M_2$. The detected output is subjected to Fourier transform to obtain a spectrum The spectrum is shown on a display 148 such as a CRT. Thus, the Raman spectrum of the sample is obtained.

Figure 21:
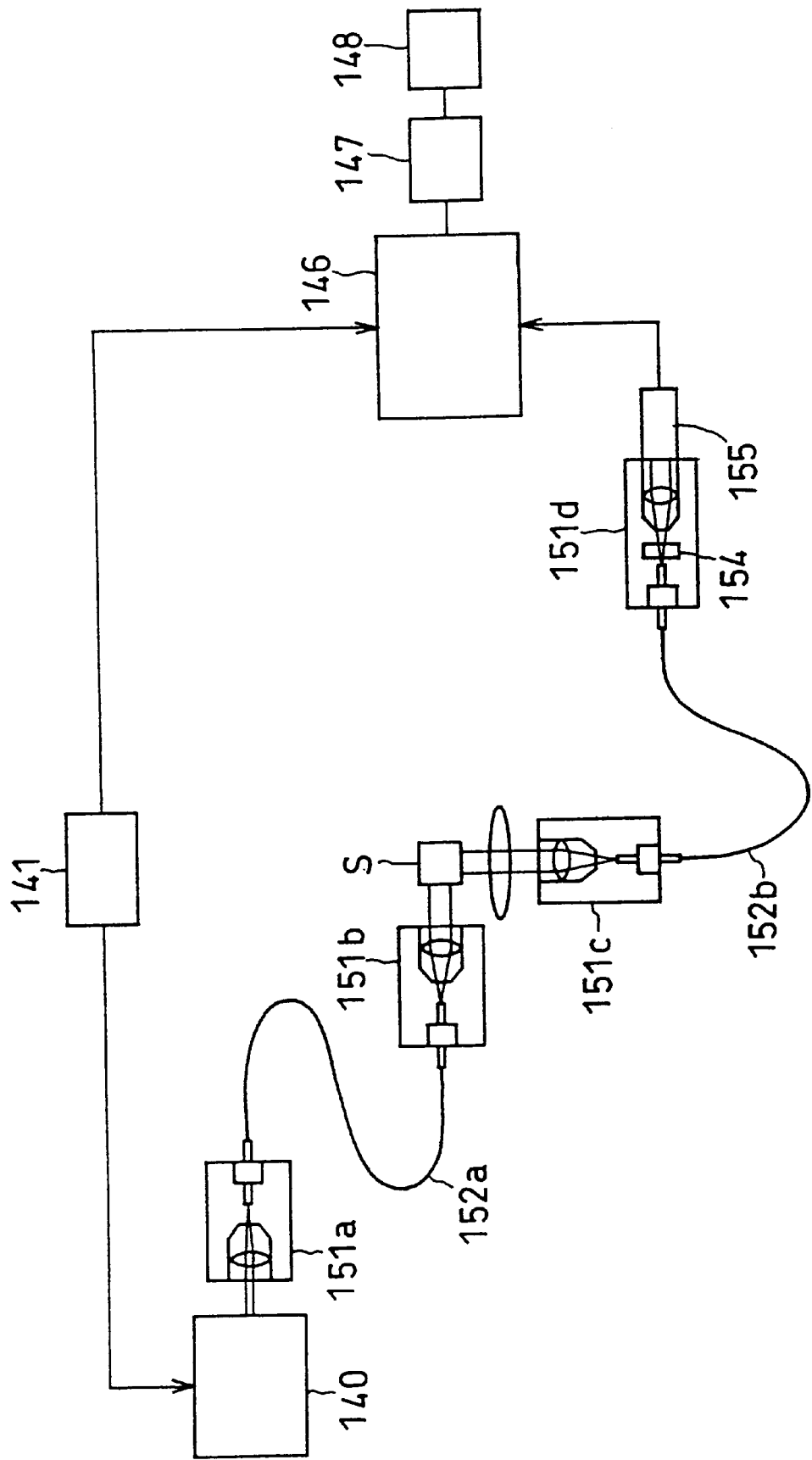
FIG. 21 is an illustrative view of an embodiment of the apparatus for spectroscopic analysis which is provided with optical fibers connecting a tunable laser to a sample, and the sample to a photodetector.

FIG. 21 is an illustrative view of an embodiment of the apparatus for spectroscopic analysis which enables telemetrical measurement by connecting a tunable laser 140 such as an ETT laser to a sample S, and the sample S to a photodetector 155 with optical fibers 152a and 152b, respectively.

An emergent light beam from the tunable laser 140 such as an ETT laser enters the light-transmitting optical fiber 152a via an optical coupler 151a and travels through the light-transmitting optical fiber 152a and emerges from an optical coupler 151b for irradiation located at the other end of the light-transmitting optical fiber 152a to irradiate the sample S. The resulting scattered light from the sample S enters the light-receiving optical fiber 152b via an optical coupler 151c for receiving light and enters an optical coupler 151d located at the other end of the light-receiving optical fiber 152b, it passes through a narrow-band-pass filter 154 provided in the optical coupler 151d and emerges therefrom. Then, the emergent light is detected by the photodetector 155 such as a photomultiplier tube. Output signals of the photodetector 55 are inputted in a lock-in amplifier 146.

As described above, the tunable laser 140 is subjected to wavelength switching by means of a controlling device 141 so as to alternately oscillate at two frequencies, i.e., a first frequency $\upsilon_{ex1}$ and a second frequency $\upsilon_{ex2}$ having a frequency difference $\Delta\upsilon_{ex}$ relative to the first frequency $\upsilon_{ex1}$. The first and second frequencies $\upsilon_{ex1}$ and $\upsilon_{ex2}$ are swept toward higher or lower frequencies while maintaining the frequency difference $\Delta\upsilon_{ex}$ constant. The control signals from the controlling device 141 are also inputted to the lock-in amplifier 146 to perform phase synchronous detection of the output signals from the photodetector 155. Based thereon, a Raman spectrum of the sample is obtained by means of a signal processor 147, and the result is shown on a display 148.

The method, which comprises connecting the tunable laser 140 with the sample S, and the sample S with the photodetector 155 by means of the optical fibers 152a and 152b, respectively, is effective in a case where it is required to place the tunable laser 140 and the other apparatus for measurement 155, 146, 147 and 148 at a distance from the sample S. As example of such a case, measurements in an isolated sick room, a high temperature or low temperature area, or an high electromagnetic noise area or the like may be mentioned. According to the method, measurements of samples located at a plurality of positions can be put under centralized control in a measuring room located several tens meters or several hundreds meters apart from the positions of the measurements.

Figure 22:
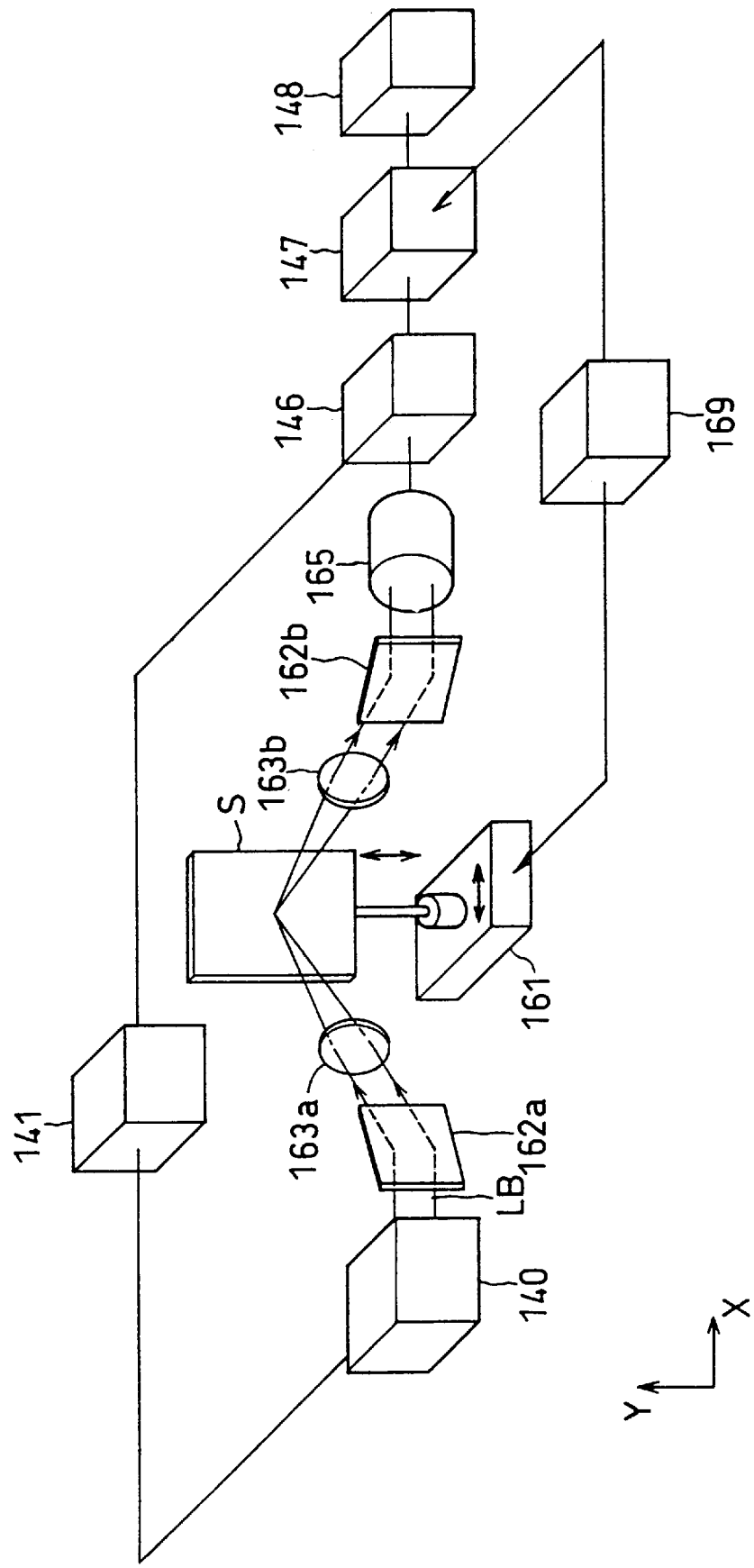
FIG. 22 is a diagrammatic view illustrating an embodiment of the apparatus for spectroscopic analysis which is capable of measuring two-dimensional distribution of Raman scattered light from a sample.
Figure 23:
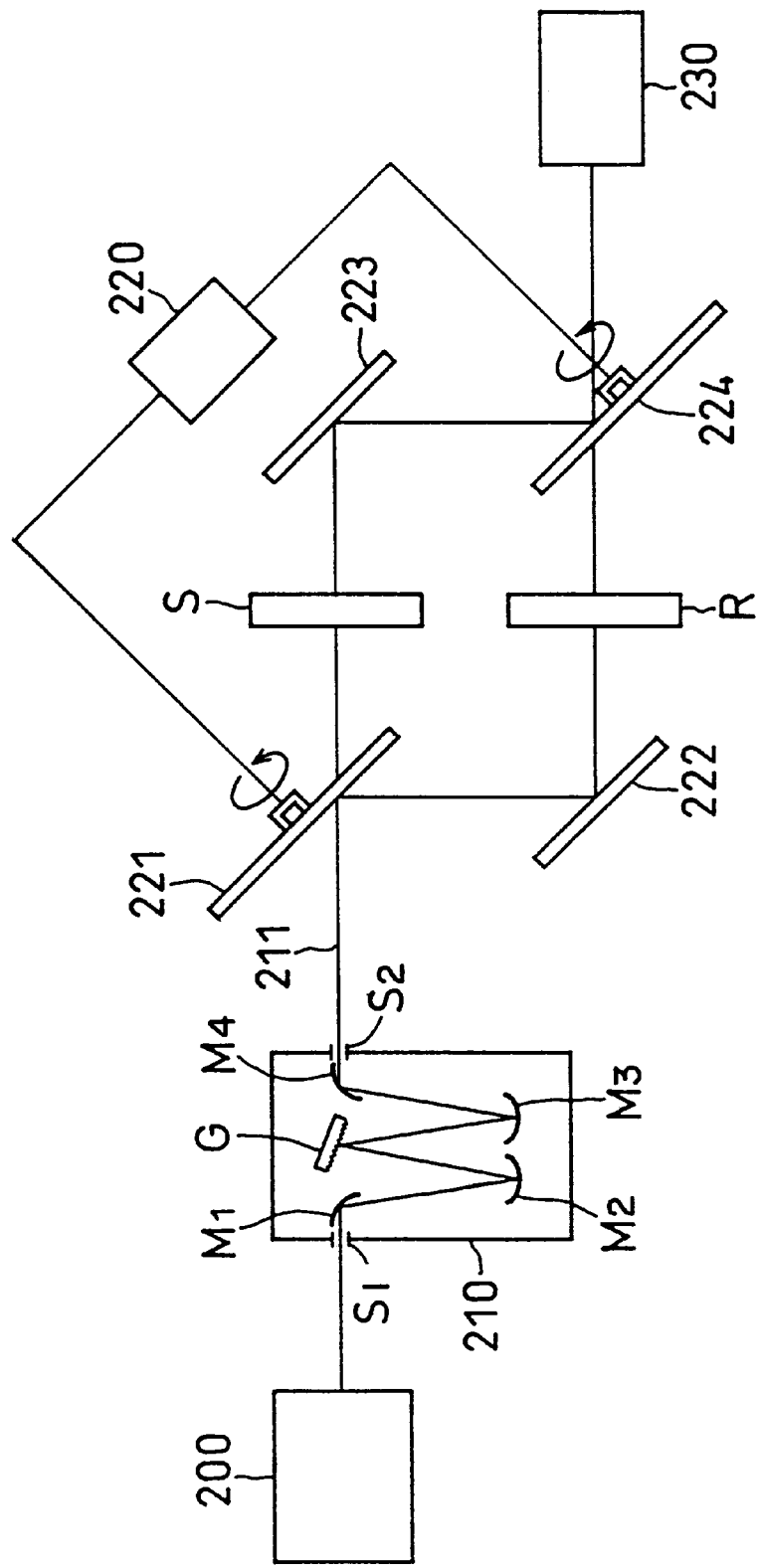
FIG. 23 is a diagrammatic view of a conventional spectrophotometer.

FIG. 22 is a diagrammatic view illustrating an embodiment of the apparatus for spectroscopic analysis which is capable of measuring two-dimensional distribution of Raman scattered light from a sample.

A sample S is held by a sample carrier 161 and movable in X and Y directions by driving means such as a motor incorporated in the sample carrier 161. A tunable laser 140 such as an ETT laser is subjected to wavelength switching under control of a controlling device 141 so as to alternately oscillate at two frequencies, i.e., a first frequency $\upsilon_{ex1}$ and a second frequency $\upsilon_{ex2}$ having a frequency difference $\Delta\upsilon_{ex}$ relative to the first frequency $\upsilon_{ex1}$. The first and second frequencies $\upsilon_{ex1}$ and $\upsilon_{ex2}$ are swept toward higher or lower frequencies while maintaining the frequency difference $\Delta\upsilon_{ex}$ constant.

A monochromatic laser beam LB emitted from the tunable laser 140 is reflected by a reflecting mirror 162a and narrowly converged by a converging lens 163a to spot-irradiate a minute area in the sample S therewith from a slanting direction. The resulting laser beam scattered by the minute area of the sample S is condensed by a condenser lens 163b and reflected by a reflecting mirror 162b to enter a photodetector 165. Output signals of the photodetector 165 are inputted to a lock-in amplifier 146 and subjected to synchronous detection in phase with the control signals from the controlling device 141. Output signals of the lock-in amplifier 146 are inputted to a signal processor 147, and a Raman spectrum is obtained by signal processing.

Position of irradiation with the monochromatic laser beam LB in the sample S is changed by moving the sample carrier 161 in X and/or Y direction by means of a sample carrier controlling device 169, and a Raman spectrum is obtained with respect to each of the positions in the sample S. Information on the position of irradiation with the laser beam in the sample S is sent from the sample carrier controlling device 169 to a signal processor 147. A two-dimensional distribution of specific Raman line intensity is obtained by the signal processor 147, and the result is shown on a monitor 148 such as a CRT. By two-dimensionally scanning the position of irradiation with the laser beam in the sample S in this manner, a Raman image of the surface of the sample can be obtained.

As a method for separating Raman scattered light from fluorescence by slightly changing an excitation wavelength, the explanation has mainly been given herein on the method which detects Raman scattered light using a lock-in amplifier based on the frequency switching effect. It is, however, apparent that by employing differential spectroscopic analysis on excitation light wavelengths $\lambda_{ex1}$ and $\lambda_{ex2}$, the method is applicable also to a usual type of Raman spectroscopy which uses an optical multi-channel analyzer and measures a spectrum at a time.

According to the present invention, by the use of the newly developed ETT laser, it is possible to carry out spectrometry of a sample without using a spectrophptometer. By virtue of this, spectrometry can be carried out without being restricted by shape or condition of a sample. This leads to greatly expanded applicability of spectrometry. Further, According to the present invention, Raman scattered light can be detected under no influence of fluorescence without using a spectroscope but using a narrow-band-pass filter such as an interference filter which is extremely easy to handle.

What is claimed is:

1. A spectrometric method for carrying out spectrometry of a sample by irradiating the sample with a monochromatic laser beam from a tunable lasers said method comprising:
   using, as said tunable lasers a tunable laser comprising a laser resonator so provided therein with a laser medium capable of laser oscillation in a predetermined range of wavelength and a birefringent acousto-optic element as to be on a predetermined optical axis of a beam component diffracted by the birefringent acousto-optic element, said tunable laser being capable of wavelength selection by selecting a frequency of an acoustic wave to be generated in the birefringent acousto-optic element.

2. The spectrometric method according to claim 1, wherein deflection of the light diffracted by the birefringent acousto-optic element from the predetermined optical axis is compensated by means of a dispersion compensating optical element.

3. The spectrometric method according to claim 1 or 2, wherein the sample is irradiated with the laser beam via an optical fiber.

4. The spectrometric method according to claim 1, 2 or 3, wherein a sample is subjected to scanning with a laser beam to carry out spectrometry of a two-dimensional area of the sample.

5. An apparatus for spectrometry comprising:
   a tunable laser comprising a laser resonator so provided therein with a laser medium capable of laser oscillation in a predetermined range of wavelength and a birefringent acousto-optic element as to be on a predetermined optical axis of a beam component diffracted by the birefringent acousto-optic element, said tunable laser capable of wavelength selection by selecting a frequency of an acoustic wave to be generated in the birefringent acousto-optic element,
   irradiation means for irradiating a sample with a monochromatic laser beam emitted from said tunable laser, and
   a photodetector for detecting the monochromatic laser beam which has interacted with the sample.

6. A method for spectroscopic analysis carried out by means of irradiation of a sample with a monochromatic light beam from a tunable laser and measurement of emitted light emanated from said sample, said method comprising:
   using, as said tunable laser, a tunable laser comprising a laser resonator so provided therein with a laser medium capable of laser oscillation in a predetermined range of wavelength and a birefringent acousto-optic element as to be on a predetermined optical axis of a beam component diffracted by the birefringent acousto-optic element, said tunable laser being capable of wavelength selection by selecting a frequency of an acoustic wave to be generated in the birefringent acousto-optic element; and measuring intensity of the emitted light emanated from said sample at a predetermined wavelength.

7. A method for spectroscopic analysis carried out by means of irradiation of a sample with a monochromatic light beam from a tunable laser and observation of emitted light emanated from said sample, said method comprising:

sweeping a wavelength of the monochromatic light beam with which said sample is irradiated at a high speed, and observing the emitted light emanated from said sample at a predetermined wavelength to obtain a spectrum of the emitted light at the observation wavelength.

8. A method for spectroscopic analysis carried out by means of irradiation of a sample with a monochromatic light beam from a tunable laser and observation of emitted light emanated from said sample, said method comprising:

sweeping a wavelength of the monochromatic light beam with which said sample is irradiated while being alternately switched between a first wavelength and second wavelength having a constant frequency difference relative to said first wavelength, and observing the emitted light emanated from said sample at a third wavelength to regard a component of the observed light which is changed in terms of time in phase with said wavelength switching as Raman scattered light, thereby attaining separate observation of Raman scattered light.

9. The method for spectroscopic analysis according to claim 8, wherein the emitted light emanated from said sample is observed at a fourth wavelength different from the third wavelength as well as at the third wavelength, and correlations with the frequency difference are compared between the third and fourth wavelengths to precisely separate Raman scattered light.

10. The method for spectroscopic analysis according to claim 8, wherein a component which is not changed by the wavelength switching in terms of time is regarded as non-Raman component to attain separate observation of Raman scattered light.

11. The method for spectroscopic analysis according to any one of claims 7 to 10 wherein as said tunable laser, use is made of a tunable laser comprising a laser resonator so provided therein with a laser medium capable of laser oscillation in a predetermined range of wavelength and a birefringent acousto-optic element as to be on a predetermined optical axis of a beam component diffracted by the birefringent acousto-optic element, said tunable laser being capable of wavelength selection by selecting a frequency of an acoustic wave to be generated in the birefringent acousto-optic element.

12. The method for spectroscopic analysis according to any one of claims 6 to 11, wherein the sample is irradiated with the monochromatic light beam from said tunable laser via an optical fiber, and the emitted light emanated from the sample is observed via an optical fiber.

13. The method for spectroscopic analysis according to any one of claims 6 to 12, wherein the sample is relatively subjected to scanning with the monochromatic light beam from the tunable laser to measure distribution of emitted light in a two-dimensional area of the sample.

14. An apparatus for spectroscopic analysis comprising:

a tunable laser for irradiating a sample with a monochromatic light beam, wavelength controlling means for sweeping a wavelength of oscillation of said tunable laser while switching the wavelength between a first wavelength and a second wavelength having a constant frequency difference relative to said first wavelength, a narrow-band-pass filter which transmits light having a third wavelength, a photodetector for detecting the light having said third wavelength which has been emitted form said sample by the irradiation with the monochromatic light beam and transmitted by said narrow-band-pass filter, and phase synchronous detection means for synchronously detecting detection signals of said photodetector in phase with wavelength switching signals between the first and second wavelengths; said apparatus thereby having function of measuring a Raman spectrum of the sample.

15. An apparatus for spectroscopic analysis comprising:

a tunable laser for irradiating a sample with a monochromatic light beam, wavelength controlling means for sweeping a wavelength of oscillation of said tunable laser while switching the wavelength between a first wavelength and a second wavelength having a constant frequency difference relative to said first wavelength, a first narrow-band-pass filter which transmits light having a third wavelength, a second narrow-band-pass filter which transmits light having a fourth wavelength different from the third wavelength, a first photodetector for detecting the light which has been emitted form said sample by the irradiation with the monochromatic light beam and transmitted by said first narrow-band-pass filter, a second photodetector for detecting the light which has been transmitted by said second narrow-band-pass filter, phase synchronous detection means for synchronously detecting detection signals of said first and second photodetectors in phase with wavelength switching signals between the first and second wavelengths, and comparing means for comparing the two phase synchronous detection signals of said phase synchronous detection means; said apparatus thereby having function of measuring a Raman spectrum of the sample.

16. An apparatus for spectroscopic analysis comprising:

a tunable laser for irradiating a sample with a monochromatic light beam, wavelength controlling means for sweeping a wavelength of oscillation of said tunable laser while switching the wavelength between a first wavelength and a second wavelength having a constant frequency difference relative to said first wavelength, an interferometer for subjecting the emitted light emanated from the sample by the irradiation with the monochromatic light beam to interference spectrometry, phase synchronous detection means for synchronously detecting output signals of said interferometer in phase with wavelength switching signals of said wavelength controlling means, and means for subjecting output of said phase synchronous detection means to Fourier transform; said apparatus thereby having function to measure a Raman spectrum of the sample.

17. The apparatus for spectroscopic analysis according to any one of claims 14 to 16, wherein said tunable laser is a tunable laser comprising a laser resonator so provided therein with a laser medium capable of laser oscillation in a predetermined range of wavelength and a birefringent acousto-optic element as to be on a predetermined optical axis of a beam component diffracted by the birefringent acousto-optic element, said tunable laser being capable of wavelength selection by selecting a frequency of an acoustic wave to be generated in the birefringent acousto-optic element.

18. The apparatus for spectroscopic analysis according to any one of claims 14 to 17, further comprising an optical fiber connecting said tunable laser to said sample and/or an optical fiber connecting said sample to said photodetector.

19. The apparatus for spectroscopic analysis according to any one of claims 13 to 18, further comprising means for relatively subjecting the sample to scanning with the monochromatic light beam from the tunable laser.

* * * * *

UNITED STATES PATENT AND TRADEMARK OFFICE
CERTIFICATE OF CORRECTION

PATENT NO. : 5,946,090
DATED : August 31, 1999
INVENTOR(S) : Hideo Tashiro, et. al.

It is certified that error appears in the above-identified patent and that said Letters Patent is hereby corrected as shown below:

Column 24, line 24, "a tunable lasers said" to --a tunable laser, said--;

line 25, "said tunable lasers" to --said tunable laser,--;

line 43, "2 or 3" should be deleted.

Column 25, line 50, "7 to 10 wherein" to --7 to 10, wherein--;

line 61, "6 to 11" to --6 to 10--;

line 66, "6 to 12" to --6 to 10--.

Column 28, line 5, "14 to 17" to --14 to 16--;

line 10, "13 to 18" to --13 to 16--.

Signed and Sealed this

Fifth Day of December, 2000

Attest:

Attesting Officer

Q. TODD DICKINSON

Director of Patents and Trademarks